US011489709B2

(12) United States Patent
Yokomakura et al.

(10) Patent No.: US 11,489,709 B2
(45) Date of Patent: Nov. 1, 2022

(54) BASE STATION APPARATUS, TERMINAL APPARATUS, COMMUNICATION METHOD, AND INTEGRATED CIRCUIT

(71) Applicants: SHARP KABUSHIKI KAISHA, Sakai (JP); FG Innovation Company Limited, Tuen Mun (HK)

(72) Inventors: Kozue Yokomakura, Sakai (JP); Yasuhiro Hamaguchi, Sakai (JP)

(73) Assignees: SHARP KABUSHIKI KAISHA, Sakai (JP); FG INNOVATION COMPANY LIMITED, Tuen Mun (HK)

( * ) Notice: Subject to any disclaimer, the term of this patent is extended or adjusted under 35 U.S.C. 154(b) by 155 days.

(21) Appl. No.: 16/482,812

(22) PCT Filed: Feb. 2, 2018

(86) PCT No.: PCT/JP2018/003569
§ 371 (c)(1),
(2) Date: Aug. 1, 2019

(87) PCT Pub. No.: WO2018/143402
PCT Pub. Date: Aug. 9, 2018

(65) Prior Publication Data
US 2020/0235979 A1 Jul. 23, 2020

(30) Foreign Application Priority Data
Feb. 2, 2017 (JP) .............................. JP2017-017371

(51) Int. Cl.
*H04W 4/00* (2018.01)
*H04L 27/26* (2006.01)
*H04L 5/00* (2006.01)

(52) U.S. Cl.
CPC ........ *H04L 27/2636* (2013.01); *H04L 5/0007* (2013.01); *H04L 5/0048* (2013.01); *H04L 5/0053* (2013.01); *H04L 27/2613* (2013.01)

(58) Field of Classification Search
CPC ..... H04W 72/04; H04W 88/08; H04W 76/00; H04L 27/2636; H04L 5/0007; H04L 5/0048; H04L 5/0053; H04L 27/2613
See application file for complete search history.

(56) References Cited

U.S. PATENT DOCUMENTS

2014/0050259 A1  2/2014  Azizi et al.
2016/0021652 A1  1/2016  Han et al.
(Continued)

FOREIGN PATENT DOCUMENTS

CN  102932091 A   2/2013
CN  105794274 A   7/2016
(Continued)

OTHER PUBLICATIONS

Ericsson, "On phase tracking in DFT-S-OFDM waveform", R1-1612338, 3GPP TSG-RAN WG1#87, Reno, USA Nov. 14-18, 2016.
(Continued)

Primary Examiner — Siren Wei
(74) Attorney, Agent, or Firm — Finnegan, Henderson, Farabow, Garrett & Dunnner, LLP

(57) ABSTRACT

A terminal apparatus for communicating with a base station apparatus, the terminal apparatus including: a transmission unit configured to transmit a Phase-tracking reference signal (PTRS); and a higher layer processing unit configured to configure information of mapping of the PTRS. An antenna port for the PTRS is associated with an antenna port for a Demodulation reference signal (DMRS).

4 Claims, 12 Drawing Sheets

(56) References Cited

U.S. PATENT DOCUMENTS

| | | | | |
|---|---|---|---|---|
| 2018/0132264 | A1* | 5/2018 | Jung | H04L 1/1812 |
| 2018/0351719 | A1* | 12/2018 | Lee | H04L 5/0053 |
| 2020/0008228 | A1* | 1/2020 | Lee | H04L 27/261 |
| 2020/0036470 | A1* | 1/2020 | Olesen | H04L 1/0033 |

FOREIGN PATENT DOCUMENTS

| | | |
|---|---|---|
| CN | 105940708 A | 9/2016 |
| RU | 2 380 845 C2 | 1/2010 |

OTHER PUBLICATIONS

CMCC, "Phase-Tracking Reference Signal Design for High-Frequency Systems", R1-1700438, 3GPP TSG RAN WG1 NR Ad-Hoc Meeting, Spokane, USA, Jan. 16-20, 2017.
Mitsubishi Electric, "On the need of PT-RS for DFTsOFDM", R1-1700646, 3GPP TSG-RAN WG1 NR-AH 1701, Spokane, Washington, Jan. 16-20, 2017.
Nokia et al., "On the PTRS design for NR", R1-1701105, 3GPP TSG RAN WG1 NR Ad-Hoc Meeting, Spokane, USA, Jan. 16-20, 2017.
LG Electronics, "Discussion on Phase Tracking RS for UL", R1-1700485, 3GPP TSG RAN WG1 NR ad-hoc, Spokane, USA Jan. 16-20, 2017.
Ericsson: "SRS Design—On DL and UL phase noise tracking RS (PTRS)", 3GPP Draft; R1-1701161 On DL and UL Phase Noise Tracking RS, 650, Route Des Lucioles ; F-06921, vol. RAN WG1, No. Spokane, WA, USA;Jan. 10, 2017, XP051203355, *p. 1-p. 9*.
NTT DOCOMO, "Revision of SI: Study on New Radio AccessTechnology", RP-161214, 3GPP TSG RAN Meeting #72, Busan, Korea, Jun. 13-16, 2016.
Mitsubishi Electric et al., "WF on PT-RS for DFTsOFDM", R1-1701435, 3GPP TSG RAN WG1 NR Ad-Hoc Meeting , Spokane, USA, Jan. 16-20, 2017.
Qualcomm Incorporated, "Phase and frequency tracking reference signal considerations", R1-1700808, 3GPP TSG-RAN WG1 #87AH, Spokane, USA, Jan. 16-20, 2017.
Catt et al., "WF on PTRS", R1-1701308, 3GPP TSG RAN WG1 AH_NR Meeting, Spokane, USA, Jan. 16-20, 2017.
Huawei et al., "Further details for PT-RS design", R1-1700073, 3GPP TSG RAN WG1 Meeting Ad Hoc for NR Spokane, USA, Jan. 16-20, 2017.
Catt, "Further discussion on phase tracking for UL", R1-1700233, 3GPP TSG RAN WG1 AH_NR Meeting, Spokane, USA, Jan. 16-20, 2017.
The Federal Service on Intellectual Property (a.k.a. Rospatent), Federal State Budgetary Enterprise "Federal Institute of Industrial Property" (FIPS) Search Report, Jul. 5, 2021 (4 pgs.).
China National Intellectual Property Administration, First Office Action for Application No. 201880008835.8, dated Dec. 1, 2021 (9 pages).
China National Intellectual Property Administration, First Search Report for Application No. 201880008835.8, dated Nov. 9, 2021 (4 pages).
Huawei et al., "Reference signal design for phase tracking," R1-1611240, 3GPP TSG RAN WG1 Meeting #87, Reno, USA, Nov. 14-18, 2016 (5 pages).
Ericsson, "Design considerations for phase noise tracking RS (PTRS)," R1-1612333, 3GPP TSG-RAN WG1 #87, Reno, USA, Nov. 14-18, 2016 (4 pages).
Catt, "Further discussion on phase tracking for DL," R1-1700232, 3GPP TSG RAN WG1 AH_NR Meeting, Spokane, USA, Jan. 16-20, 2017 (4 pages).
Intel Corporation, "Discussion on Reference Signal for Phase Tracking," R1-1700355, 3GPP TSG RAN WG1 NR Ad-Hoc Meeting, Spokane, USA, Jan. 16-20, 2017 (5 pages).
Japan Patent Office on Behalf of International Search Authority, International Search Report for PCT/JP2018/003569, dated Apr. 17, 2018 (4 pages).
Japan Patent Office on Behalf of International Search Authority, Written Opinion of the International Search Authority for PCT/JP2018/003569, dated Apr. 17, 2018 (7 pages).
Huawei et al., "WF on RS for Phase Tracking," R1-1613426, 3GPP TSG RAN WG1 Meeting #87, Reno, USA, Nov. 14-18, 2016 (3 pages).
China National Intellectual Property Administration, Second Office Action for Application No. 201880008835.8, dated Jun. 6, 2022 (10 pages).
China National Intellectual Property Administration, Supplementary Search Report for Application No. 201880008835.8, dated Jun. 6, 2022 (4 pages).
Etri, "Discussion on phase tracking RS design," R1-1700579, 3GPP TSG RAN WG1 NR Ad-Hoc Meeting, Spokane, WA, USA, Jan. 16-20, 2017 (6 pages).
Nokia and Alcatel-Lucent Shanghai Bell, "DFT-S-OFDM impacts in the NR UL design," R1-1701017, 3GPP TSG RAN WG1 NR Ad-Hoc, Spokane, WA, USA, Jan. 16-20, 2017 (2 pages).
Qualcomm Incorporated, "User Multiplexing of DFTs-OFDM and OFDM in uplink," R1 -1610114, 3GPP TSG-RAN WG1 #86, Oct. 10-14, 2016, Lisbon, Portugal (5 pages).
Qualcomm Incorporated, "UL waveform configuration," R1-1612075, 3GPP TSG-RAN WG1 #87, Nov. 14-18, 2016, Reno, NV, USA (6 pages).
Qualcomm Incorporation, "UL channelization in long UL duration," R1-1612074, 3GPP TSG RAN WG1 #87, Nov. 14-18, 2016, Reno, NV, USA (5 pages).

* cited by examiner

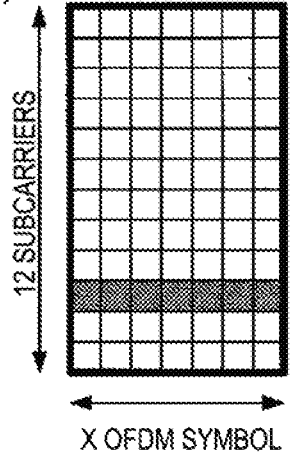
FIG. 6A PATTERN 1
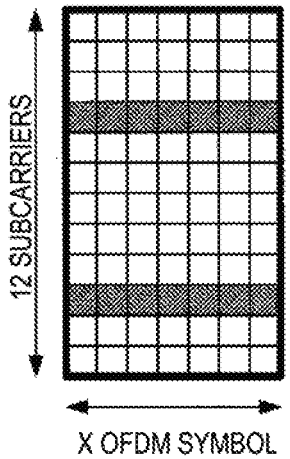
FIG. 6B PATTERN 2
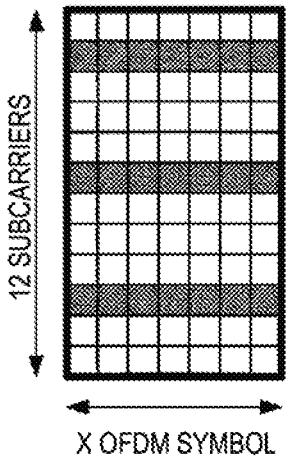
FIG. 6C PATTERN 3
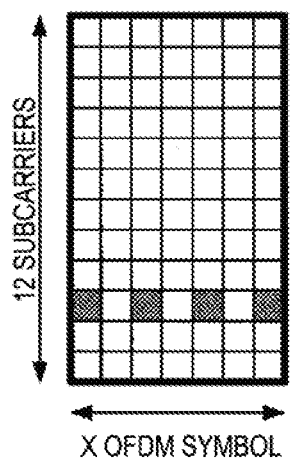
FIG. 6D PATTERN 4
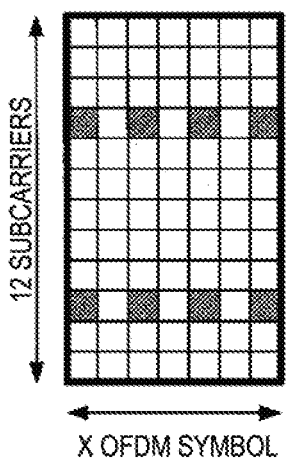
FIG. 6E PATTERN 5
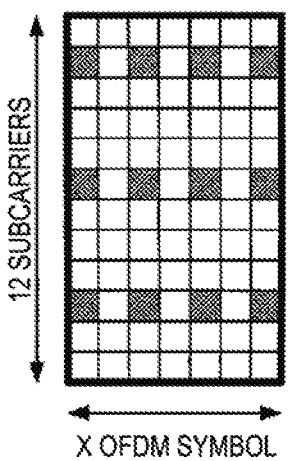
FIG. 6F PATTERN 6
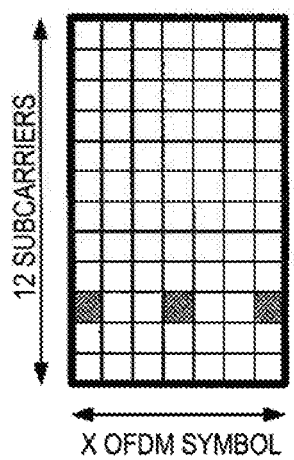
FIG. 6G PATTERN 7
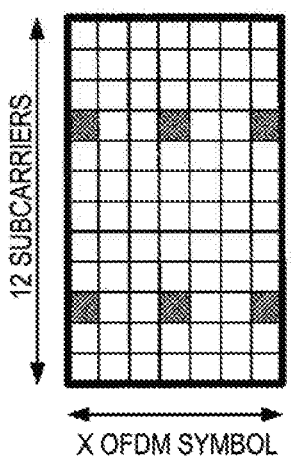
FIG. 6H PATTERN 8
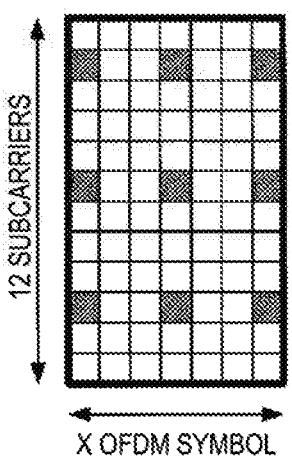
FIG. 6I PATTERN 9

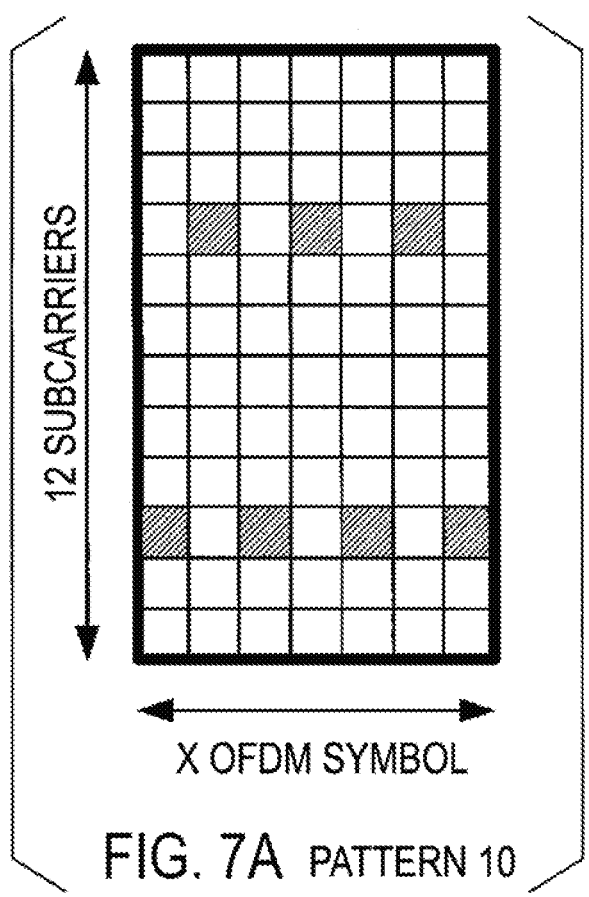
FIG. 7A PATTERN 10

BASE STATION APPARATUS, TERMINAL APPARATUS, COMMUNICATION METHOD, AND INTEGRATED CIRCUIT

TECHNICAL FIELD

The present invention relates to a base station apparatus, a terminal apparatus, a communication method, and an integrated circuit.

This application claims priority based on JP 2017-017371 filed on Feb. 2, 2017, the contents of which are incorporated herein by reference.

BACKGROUND ART

Currently, the Third Generation Partnership Project (3GPP) is conducting a technical study and standardization of Long Term Evolution (LTE)-Advanced Pro and New Radio technology (NR) as a radio access method and a radio network technology for the 5th generation cellular system (NPL 1).

In the 5th generation cellular system, three technologies are required for the expected service scenario, that is, enhanced Mobile BroadBand (eMBB) to realize a high-speed and high-capacity transmission. Ultra-Reliable and Low Latency Communication (URLLC) to realize a low delay and highly reliable communication, and massive Machine Type Communication (mMTC), such as Internet of Things (IoT), that allows a large number of machine type devices to be connected.

In NR, reference signals for tracking phase noise generated by an oscillator have been studied for communication at high frequencies. (NPL 2).

CITATION LIST

Non Patent Literature

NPL 1: RP-161214, NTT DOCOMO, "Revision of SI: Study on New Radio Access Technology", June 2016

NPL 2: R1-1701435, Mitsubishi Electric, CATT, InterDigital, Intel, Qualcomm, "WF on PT-RS for DFTs OFDM", January 2017

SUMMARY OF INVENTION

Technical Problem

An object of the present invention is to provide a terminal apparatus, a base station apparatus, a communication method, and an integrated circuit for efficiently communicating in the above-mentioned radio communication systems.

Solution to Problem (1) To accomplish the object described above, aspects of the present invention are contrived to provide the following measures. Specifically, the terminal apparatus according to one aspect of the present invention is a terminal apparatus for communicating with a base station apparatus and including: a transmission unit configured to transmit a Phase-tracking reference signal (PTRS); and a higher layer processing unit configured to configure information of mapping of the PTRS. An antenna port for the PTRS is associated with an antenna port for a Demodulation reference signal (DMRS).

(2) In the terminal apparatus according to the one aspect of the present invention, the antenna port for the PTRS is identical to an antenna port for a DMRS.

(3) In the terminal apparatus according to the one aspect of the present invention, the antenna port for the PTRS is identical to the antenna port for the DMRS.

(4) A base station apparatus according to one aspect of the present invention is a base station apparatus for communicating with a terminal apparatus, and including: a reception unit configured to receive a Phase-tracking reference signal (PTRS); and a higher layer processing unit configured to configure information of mapping of the PTRS in the terminal. An antenna port for the PTRS is associated with an antenna port for a Demodulation reference signal (DMRS).

Advantageous Effects of Invention

According to one aspect of the present invention, a base station apparatus and a terminal apparatus efficiently communicate with each other.

BRIEF DESCRIPTION OF DRAWINGS

FIGS. 6A to 6I are diagrams, each illustrating a first configuration example of PTRS mapped to a single resource element.

FIG. 7A is a diagram illustrating a second configuration example of PTRS mapped to a single resource element.

DESCRIPTION OF EMBODIMENTS

Embodiments of the present invention will be described below.

Figure 1:
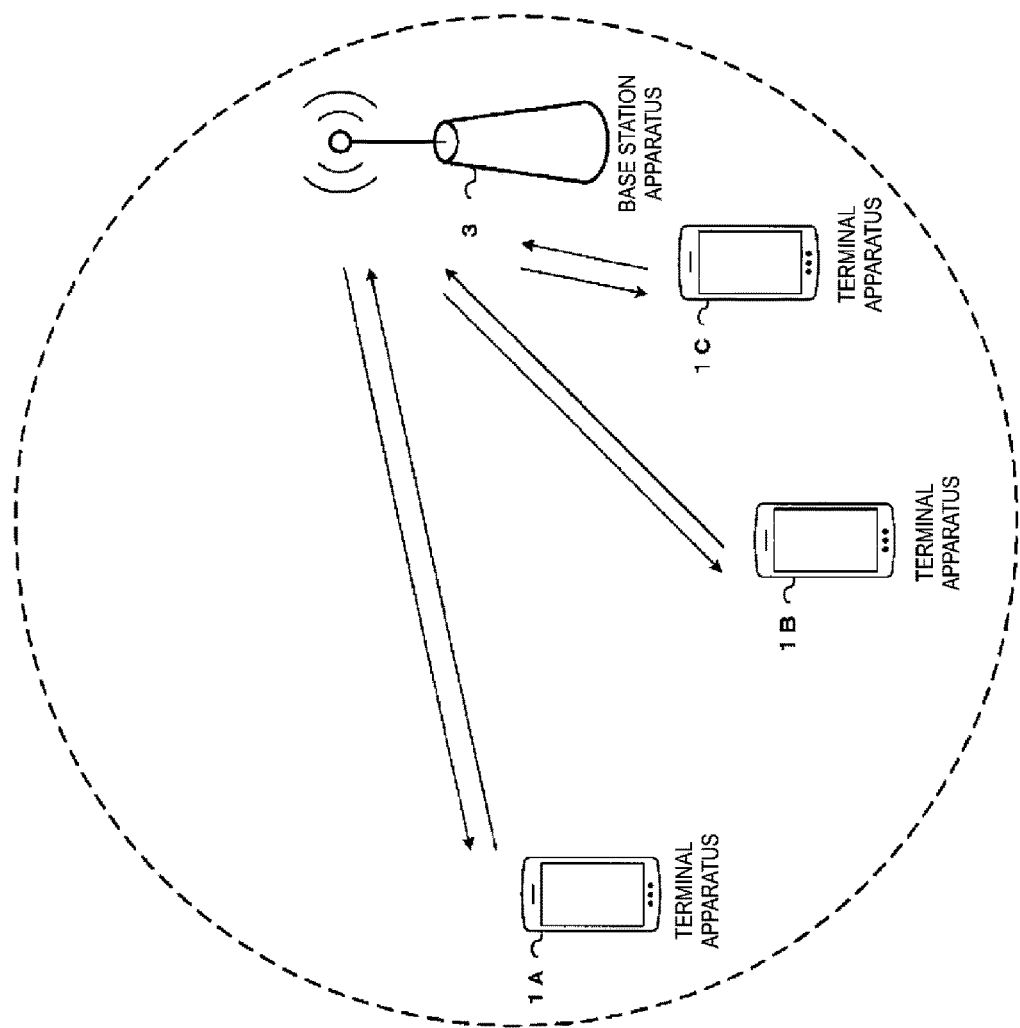
FIG. 1 is a diagram illustrating a concept of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Hereinafter, the terminal apparatuses 1A to 1C are each also referred to as a terminal apparatus 1.

The terminal apparatus 1 is also called a user terminal, a mobile station device, a communication terminal, a mobile device, a terminal. User Equipment (UE), and a Mobile Station (MS). The base station apparatus 3 is also called a radio base station apparatus, a base station, a radio base station, a fixed station, a NodeB (NB), an evolved NodeB (eNB), a Base Transceiver Station (BTS), a Base Station (BS), an NR NodeB (NR NB), an NNB, a Transmission and Reception Point (TRP), and a gNB.

In FIG. 1, Orthogonal Frequency Division Multiplexing (OFDM) including Cyclic Prefix (CP), Single Carrier Frequency Division Multiplexing (SC-FDM), Discrete Fourier Transform Spread OFDM (DFT-S-OFDM), and Multi-Carrier Code Division Multiplexing (MC-CDM) may be used for radio communication between the terminal apparatus 1 and the base station apparatus 3.

In FIG. 1, in the radio communication between the terminal apparatus 1 and the base station apparatus 3, Universal-Filtered Multi-Carrier (UFMC), Filtered OFDM (F-OFDM), OFDM in which a window is multiplied (Windowed OFDM), and Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention.

In FIG. 1, the aforementioned transmission scheme that uses no CP or uses zero padding instead of the CP may be used for the radio communication between the terminal apparatus 1 and the base station apparatus 3. Further, the CP and the zero padding may be added both forward and backward.

In FIG. 1, Orthogonal Frequency Division Multiplexing (OFDM) including Cyclic Prefix (CP), Single Carrier Frequency Division Multiplexing (SC-FDM), Discrete Fourier Transform Spread OFDM (DFT-S-OFDM), and Multi-Carrier Code Division Multiplexing (MC-CDM) may be used for radio communication between the terminal apparatus 1 and the base station apparatus 3.

In FIG. 1, the following physical channels are used for radio communication between the terminal apparatus 1 and the base station apparatus 3.

Physical Broadcast CHannel (PBCH)
Physical Control CHannel (PCCH)
Physical Shared CHannel (PSCH)

The PBCH is used to broadcast an important information block (Master Information Block: MIB, Essential Information Block: EIB, Broadcast Channel: BCH) including important system information required by the terminal apparatus 1.

In a case of uplink radio communication (radio communication from the terminal apparatus 1 to the base station apparatus 3), the PCCH is used to transmit Uplink Control Information (UCI). Here, the uplink control information may include Channel State Information (CSI) used to indicate a downlink channel stale. The uplink control information may include Scheduling Request (SR) used to request an UL-SCH resource. The uplink control information may include Hybrid Automatic Repeat reQuest ACKnowledgment (HARQ-ACK). The HARQ-ACK may indicate HARQ-ACK for downlink data (Transport block, Medium Access Control Protocol Data Unit (MAC PDU), Downlink-Shared Channel (DL-SCH)).

Furthermore, in a case of downlink radio communication (radio communication from the base station apparatus 3 to the terminal apparatus 1), the PCCH in used to transmit Downlink Control Information (DCI). Here, one or more DCIs (which may be referred to as DCI formats) are defined for transmission of the Downlink Control Information. That is, a field for the Downlink Control Information is defined as the DCI, and is mapped to information bits.

For example, DCI including information for indicating whether a signal included in the scheduled PSCH is a downlink radio communication or uplink radio communication may be defined.

For example, DCI including information for indicating a downlink transmission period included in the scheduled PSCH may be defined.

For example, DCI including information for indicating an uplink transmission period included in the scheduled PSCH may be defined.

For example, DCI including information for indicating a timing for transmitting HARQ-ACK for the scheduled PSCH (for example, the number of symbols from the last symbol included in the PSCH to the HARQ-ACK transmission) may be defined.

For example, DCI including information for indicating a downlink transmission period, a gap, and an uplink transmission period that are included in the scheduled PSCH may be defined.

For example, DCI to be used for scheduling a PSCH for downlink radio communication in one cell (transmission of one downlink transport block) may be defined.

For example, DCI to be used for scheduling a PSCH for uplink radio communication in one cell (transmission of one uplink transport block) may be defined.

Here, information on scheduling of the PSCH is included in the DCI in a case that an uplink or a downlink is included in the PSCH. Here, the DCI for the downlink is also referred to as downlink grant or downlink assignment. Here, the DCI for the uplink is also referred to as uplink grant or Uplink assignment.

The PSCH is used to transmit uplink data (Uplink Shared CHannel: UL-SCH) or downlink data (Downlink Shared CHannel: DL-SCH) from Medium Access Control (MAC). In a case of the downlink, the PSCH is also used to transmit System Information (SI) and Random Access Response (RAR). In a case of the uplink, the PSCH may be used to transmit HARQ-ACK and/or CSI, together with the uplink data. Furthermore, the PSCH may be used to transmit CSI only or HARQ-ACK and CSI only. That is, the PSCH may be used to transmit UCI only.

Here, the base station apparatus 3 and the terminal apparatus 1 exchange (transmit and/or receive) signals with each other in their respective higher layers. For example, the base station apparatus 3 and the terminal apparatus 1 may transmit and receive radio resource control (RRC) signaling (also referred to as RRC message or RRC information) in the RRC layer, respectively. The base station apparatus 3 and the terminal apparatus 1 may transmit and receive a Medium Access Control (MAC) control element in a MAC layer, respectively. Here, the RRC signaling and/or the MAC control element is also referred to as higher layer signaling.

The PSCH may be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1. The PSCH may be used to transmit UE Capability in the uplink.

Although the names PCCH and PSCH are consistently used for both the downlink and uplink, different channels may be defined for the downlink and uplink.

For example, the downlink shared channel may be referred to as a Physical Downlink Shared CHannel (PDSCH). The uplink shared channel may be referred to as a Physical Uplink Shared CHannel (PUSCH). The downlink control channel may be referred to as a Physical Downlink Control Channel (PDCCH). The uplink control channel may be referred to as a Physical Uplink Control CHannel (PUCCH).

In FIG. 1, the following downlink physical signals are used for downlink radio communication. Here, the downlink physical signals are not used to transmit the information output from the higher layers but is used by the physical layer.

Synchronization Signal (SS)
Reference Signal (RS)

The synchronization signal may include a Primary Synchronization Signal (PSS) and a Second Synchronization Signal (SSS). Cell IDs may be detected using the PSS and the SSS.

The synchronization signal is used for the terminal apparatus 1 to take synchronization in the frequency domain and the time domain in the downlink. Furthermore, the synchronization signal may be used for the terminal apparatus 1 to perform a selection regarding the precoding by the base station apparatus 3 or a selection regarding the precoding or beam in the beamforming.

The reference signal is used for the terminal apparatus 1 to perform channel compensation on a physical channel. The reference signal may also be used in order for the terminal apparatus 1 to obtain the downlink CSI. In addition, the reference signal may be used for a radio parameter, a numerology such as a subcarrier spacing, and fine synchronization that allows FFT window synchronization, or the like to be performed.

According to the present embodiment, one or more of the following downlink reference signals are used.

Demodulation reference signal (DMRS)
Channel state information reference signal (CSI-RS)
Phase tracking reference signal (PTRS)
Mobility reference signal (MRS)

The DMRS is used to demodulate a modulated signal. Note that the DMRS may have two defined types of reference signals for demodulating the PBCH and for demodulating the PSCH, and both of them may be referred to as DMRS. The CSI-RS is used to measure Channel State Information (CSI) and perform beam management. The PTRS is used to track phase shifts due to movement of terminals and the like. The MRS may be used to measure reception quality from a plurality of base station apparatuses for handovers. A reference signal for compensating for phase noise may also be defined as the reference signal.

The downlink physical channels and/or the downlink physical signals are collectively referred to as a downlink signal. The uplink physical channels and/or the uplink physical signals are collectively referred to as an uplink signal. The downlink physical channels and/or the uplink physical channels are collectively referred to as a physical channel. The downlink physical signals and/or the uplink physical signals are collectively referred to as a physical signal.

The BCH, the UL-SCH, and the DL-SCH are transport channels. A channel used in a Medium Access Control (MAC) layer is referred to as a transport channel. A unit of the transport channel used in the MAC layer is also referred to as a Transport Block (TB) and/or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The reference signal may also be used for Radio Resource Measurement (RRM). The reference signal may also be used for beam management.

The beam management may be a procedure performed by the base station apparatus 3 and/or the terminal apparatus 1 for acquiring beam gains by matching directionality of an analog and/or digital beam in a transmission device (the base station apparatus 3 for downlink and the terminal apparatus 1 for uplink) and directionality of an analog and/or digital beam in a reception device (the terminal apparatus 1 for downlink and the base station apparatus 3 for uplink).

Note that the beam management may include the following procedures.

Beam selection
Beam refinement
Beam recovery

For example, the beam selection may be a procedure for selecting a beam in communications between the base station apparatus 3 and the terminal apparatus 1. Furthermore, the beam refinement may be a procedure for selecting a beam with a higher gain or changing beams between the optimal base station apparatus 3 and the terminal apparatus 1 due to the movement of the terminal apparatus 1. The beam recovery may be a procedure for respecting a beam in a case that the quality of the communication link decreases due to blockage, caused by a blocking body, passage of a person, or the like, in communications between the base station apparatus 3 and the terminal apparatus 1.

For example, the CSI-RS may be used by the terminal apparatus 1 in selecting a transmission beam from the base station apparatus 3, or a Quasi Co-Location (QCL) assumption may be used.

In a case that Long Term Property of a channel on which a symbol on an antenna port is carried can be estimated from a channel on which a symbol on another antenna port is carried, the two antenna ports are said to be quasi co-located (in a QCL state). The Long term property includes one or a plurality of delay spread, Doppler spread, Doppler shift, average gain, and average delay. For example, in a case that an antenna port 1 and an antenna port 2 are in the QCL state in terms of average delay, the reception timing of the antenna port 2 may be inferred from the reception timing of the antenna port 1.

The QCL may also be expanded to beam management. Thus, spatially expanded QCL may be newly defined. Examples of the Long Term Property of a channel in spatial QCL assumption may include an Angle of Arrival (AoA) or a Zenith angle of Arrival (ZoA), an Angle Spread (an Angle Spread of Arrival (ASA) or a Zenith angle Spread of Arrival (ZSA) for example), an Angle of Departure (AoD or ZoD for example) and their Angle Spreads (for example, Angle Spread of Departure (ASD), Zenith angle Spread of Departure (ZSS)), and Spatial Correlation in a wireless link or a channel.

Thus, an operation of the base station apparatus 3 and the terminal apparatus 1 equivalent to the beam management based on spatial QCL assumption and radio resource (time and/or frequency) may be defined as the beam management.

The subframe will now be described. The subframe in the embodiment may also be referred to as a resource unit, a radio frame, a time period, or a time interval.

Figure 2:
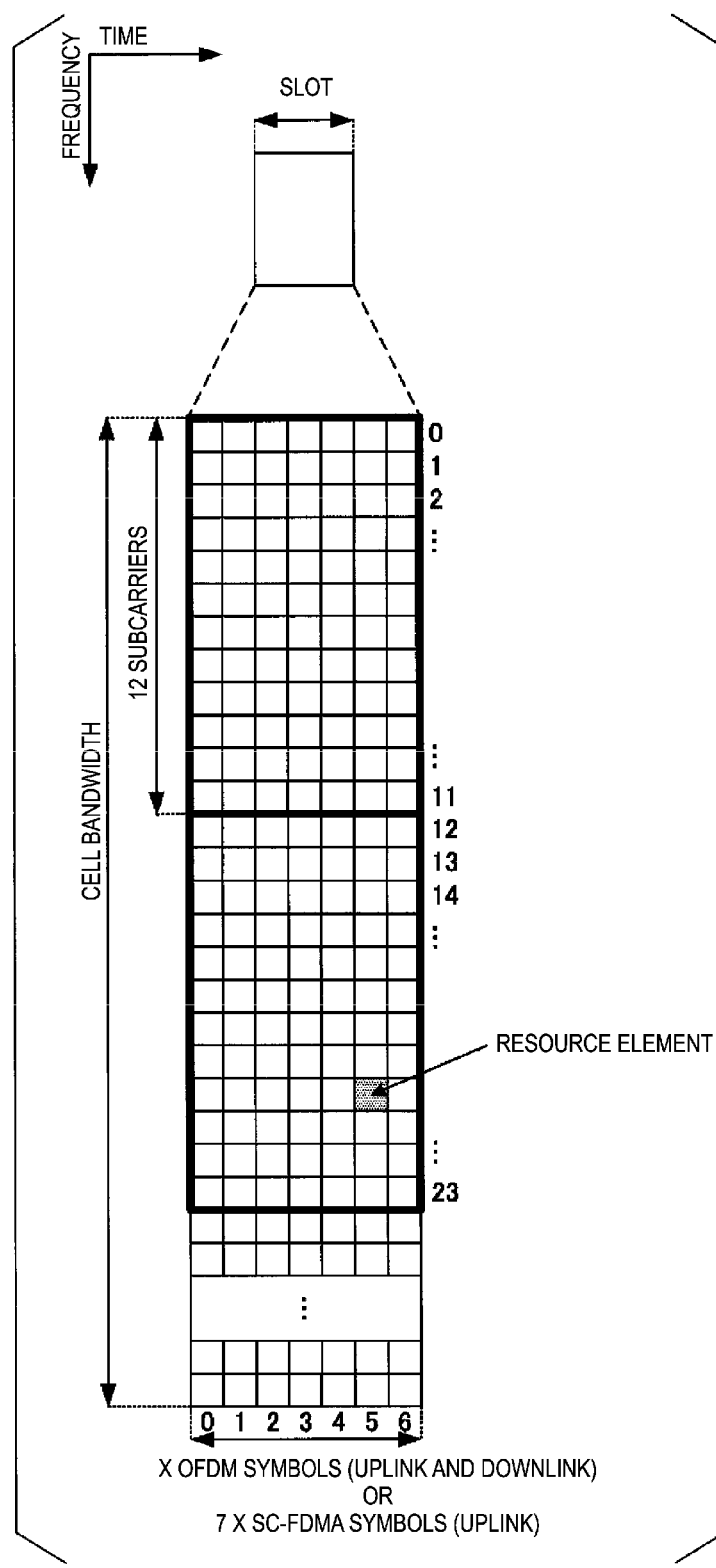
FIG. 2 is a diagram illustrating an example of a schematic configuration of an uplink slot according to the present embodiment.
Figure 3:
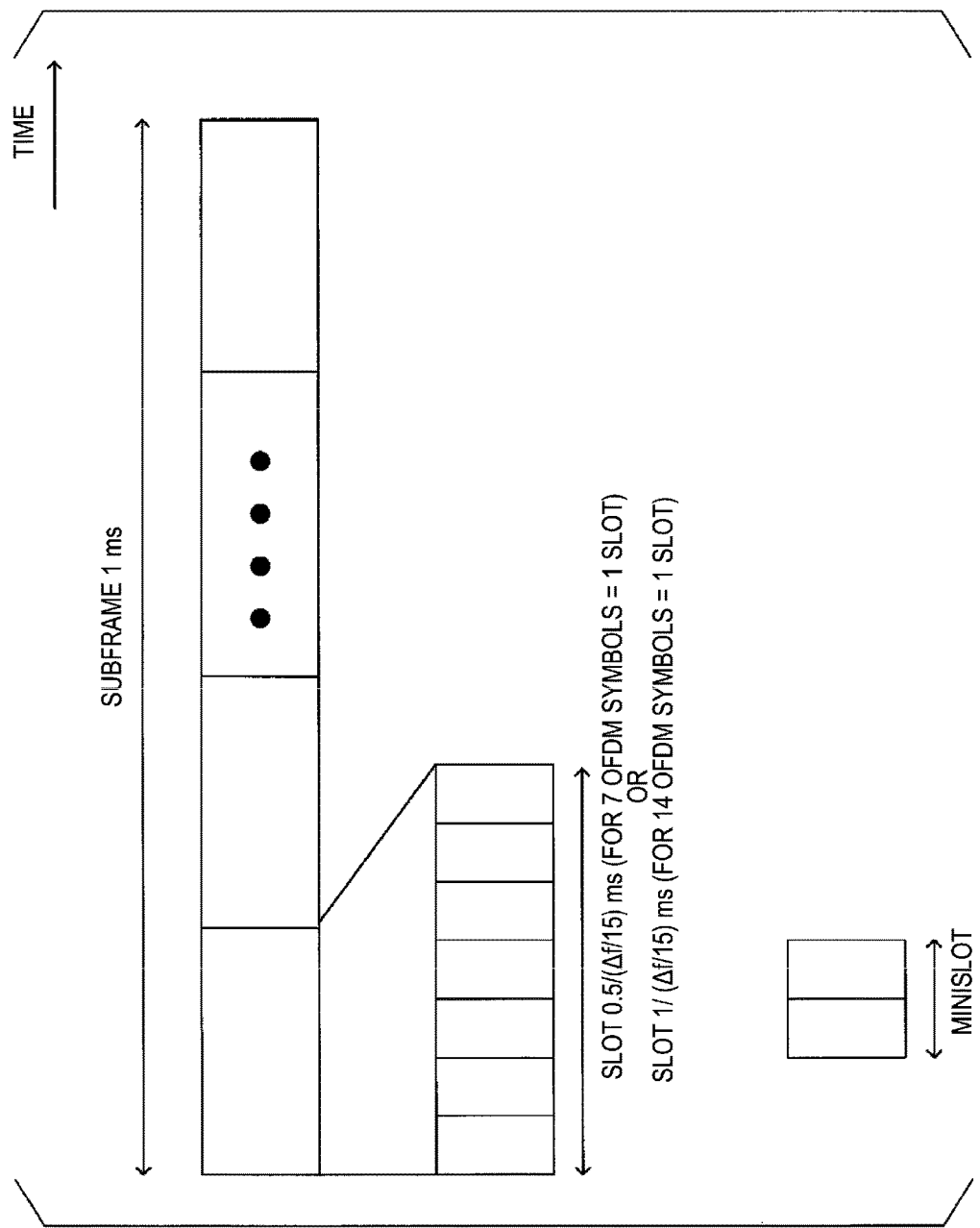
FIG. 3 is a diagram illustrating a relationship in a time domain of a subframe, a slot, and a mini-slot.

FIG. 2 is a diagram illustrating a schematic configuration of an uplink slot according to a first embodiment of the present invention. Each of the radio frames is 10 ms in length. Each of the radio frames is constituted of 10 subframes and X slots. In other words, each subframe has a length of 1 ms. The time length of each of the slots is defined by subcarrier spacing. For example, in a case of Normal Cyclic Prefix (NCP) with the subcarrier spacing of OFDM symbols being 15 kHz, X is 7 or 14 respectively corresponding to 0.5 ms or 1 ms. In addition, in a case that the subcarrier spacing is 60 kHz, X is 7 or 14 respectively corresponding to 0.125 ms or 0.25 ms. FIG. 2 illustrates an example of a case that X is 7. Note that the case can be similarly extended to a case that X is 14. The uplink slot may be defined similarly, and the downlink slot and the uplink slot may be defined separately from one another.

The signal or the physical channel transmitted in each of the slots may be expressed by a resource grid. The resource grid is defined by a plurality of subcarriers and a plurality of OFDM symbols. The number of subcarriers constituting one slot depends on a bandwidth of a cell in each of the downlink and the uplink. Each element within the resource grid is referred to as a resource element. The resource element may be identified by a subcarrier number and an OFDM symbol number.

A resource block is used to express mapping of a certain physical downlink channel (such as the PDSCH) or a certain physical uplink channel (such as the PUSCH) to resource elements. For the resource block, a virtual resource block and a physical resource block are defined. A certain physical uplink channel is first mapped to a virtual resource block. Thereafter, the virtual resource block is mapped to the physical resource block. In the case of NCP with the number of OFDM symbols being X=7, one physical resource block is defined by seven consecutive OFDM symbols in the time domain and by 12 consecutive subcarriers in the frequency domain. Hence, one physical resource block includes (7×12) resource elements. In a case of Extended CP (ECP), one physical resource block is defined by six consecutive OFDM symbols in the time domain and by 12 consecutive subcarriers in the frequency domain. Hence, one physical resource block includes (6×12) resource elements. Furthermore, one physical resource block corresponds to one slot in the time domain and corresponds to 180 kHz in the frequency domain in a case that the subcarrier spacing is 15 kHz (720 kHz in a case that the subcarrier spacing is 60 kHz). Physical resource blocks are numbered from 0 in the frequency domain.

Figure 5:
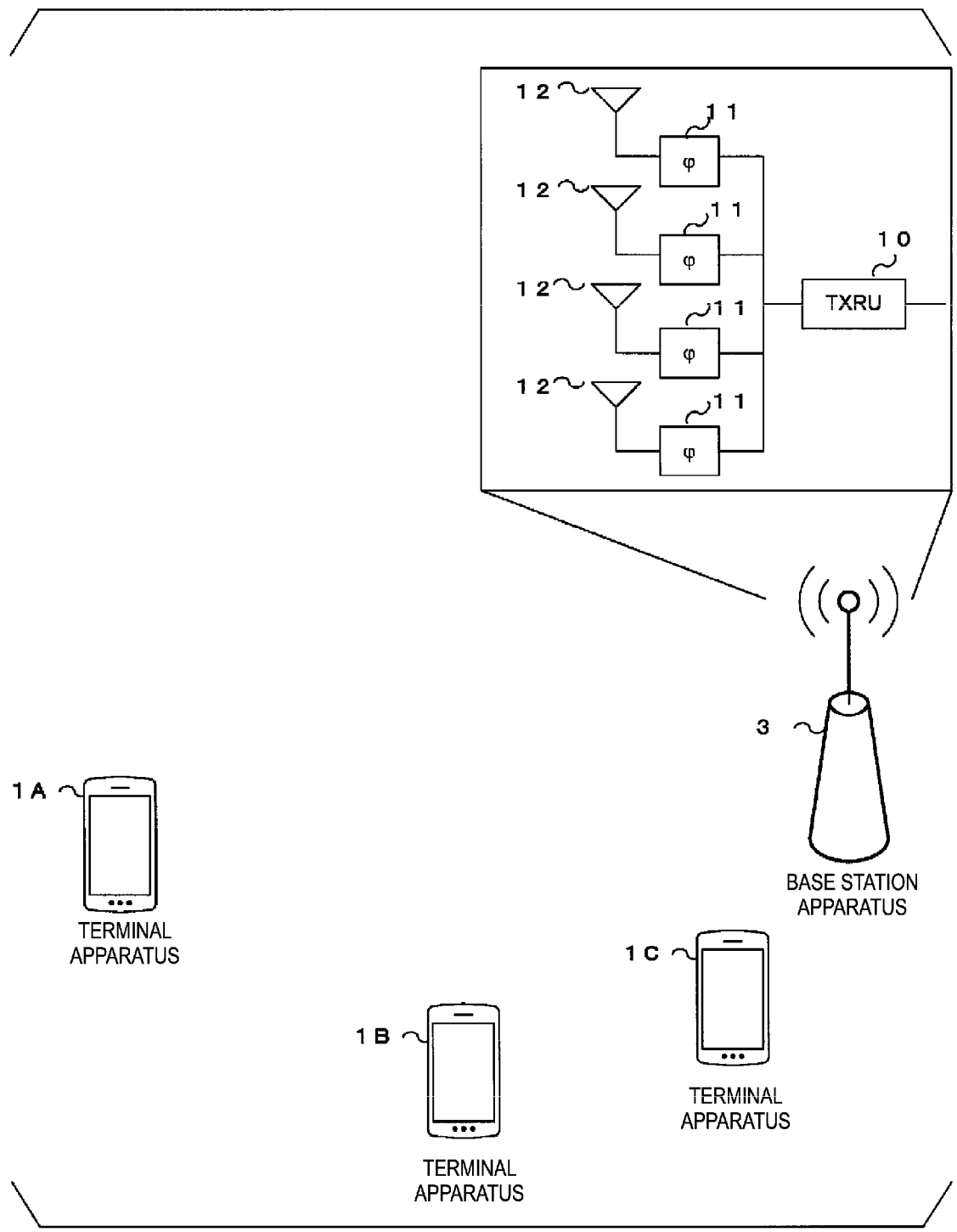
FIG. 5 is a diagram illustrating an example of beam forming.

Next, a subframe, a slot, and a minislot will be described. FIG. 5 is a diagram illustrating a relationship among a subframe, a slot, and a mini-slot in a time domain. As illustrated in the figure, three types of time units are defined. The subframe is 1 ms regardless of the subcarrier spacing, whereas the slot includes 7 or 14 OFDM symbols and has a slot length depending on the subcarrier spacing. Specifically, in a case that the subcarrier spacing is 15 kHz, a single subframe includes 14 OFDM symbols. Thus, in a case that the subcarrier spacing is $\Delta f$ (kHz), the slot length may be defined as $0.5/(\Delta f/15)$ ms in a case that a single slot includes seven OFDM symbols. This $\Delta f$ may be defined by subcarrier spacing (kHz). The slot length may be defined as $1/(\Delta f/15)$ ms in a case that a single slot includes seven OFDM symbols. This $\Delta f$ may be defined by subcarrier spacing (kHz). Furthermore, the slot length may be defined as $X/14/(\Delta f/15)$ ms, where X is the number of OFDM symbols in a slot.

Figure 4:
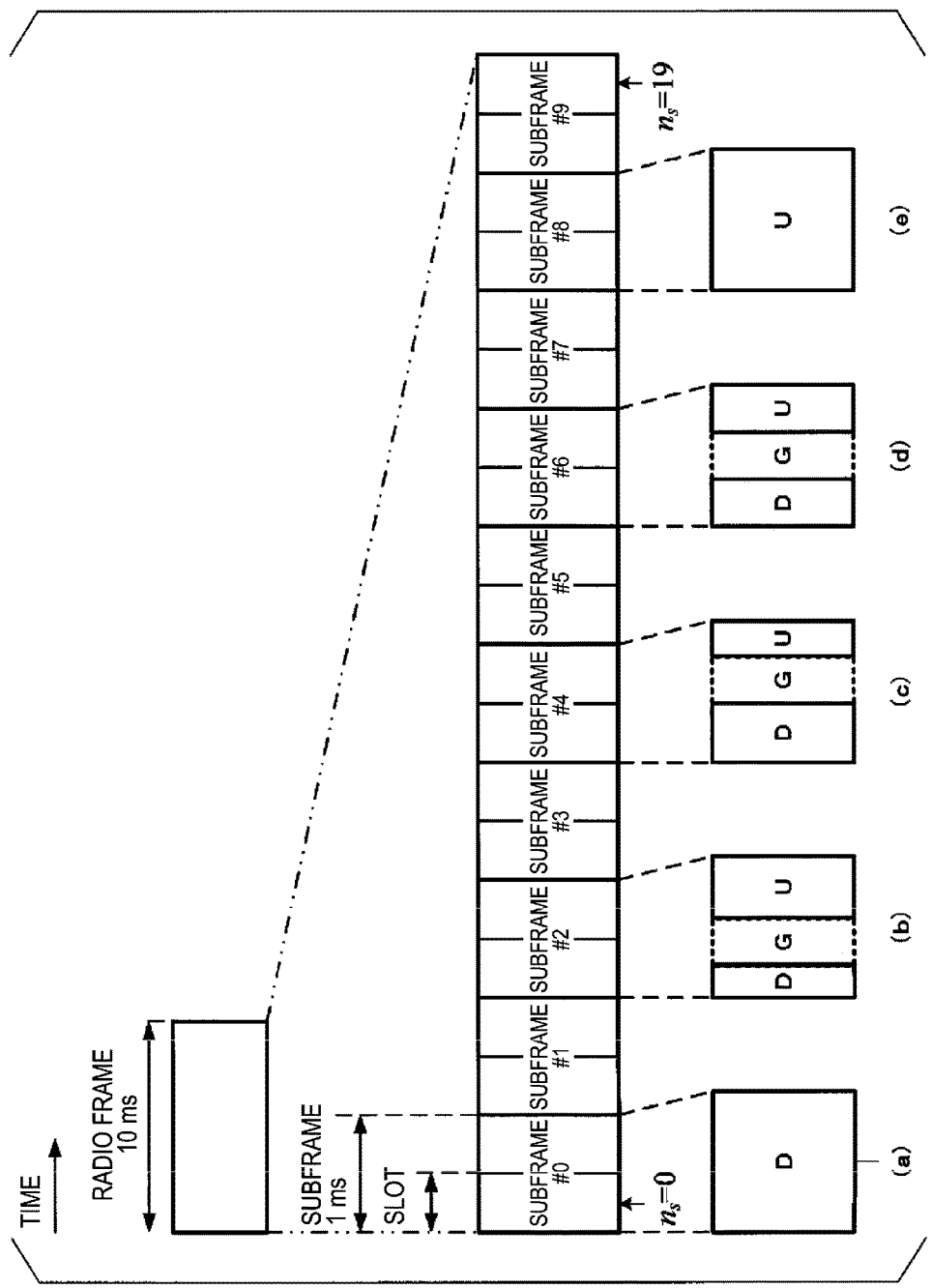
FIG. 4 is a diagram illustrating an example of a slot or a subframe.

The mini-slot (which may be referred to as a sub-slot) is a time unit including OFDM symbols that are less than the number of OFDM symbols included in a slot. The figure illustrates an example of a case that the mini-slot includes 2 OFDM symbols. The OFDM symbols in the mini-slot and the OFDM symbols in the slot may match in timing. Note that a slot or mini-slot may be the minimum scheduling unit. Also, FIG. 4 is a diagram illustrating an example of a slot or a subframe. Here, an example of a case is illustrated in which the slot length is 0.5 ms with the subcarrier spacing being 15 kHz. In the figure, D represents the downlink, and U represents the uplink. As illustrated in the figure, during a certain time duration (for example, the minimum time duration to be allocated to an UE in the system), the subframe may include one or more of the followings:

a downlink part (duration);
the gap
an uplink part (duration).

Part (a) of FIG. 4 illustrates an example in which the entire subframe is used for downlink transmission during a certain time duration (for example, a minimum time resource unit that can be allocated to a UE, which may also be referred to as a time unit. Furthermore, a combination of a plurality of minimum time resource units may be referred to as a time unit). Part (b) of FIG. 4 illustrates an example in which an uplink is scheduled via a PCCH for example by using the first time resource, and an uplink signal is transmitted after a gap for a processing delay of the PCCH, a time for switching from a downlink to an uplink, and generation of a transmit signal. Part (c) of FIG. 4 illustrates an example in which a downlink PCCH and/or downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the HARQ-ACK and/or CSI, namely, the UCI. Part (d) of FIG. 4 illustrates an example in which a downlink PCCH and/or a downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the uplink data, namely, the UL-SCH. Part (e) of FIG. 4 illustrates an example in which the entire subframe is used for uplink transmission (uplink PSCH or PCCH).

The above-described downlink part and uplink part may include multiple OFDM symbols as is the case with LTE.

FIG. 5 illustrates an example of the beam forming. A plurality of antenna elements are connected to a single transmission unit (Transceiver unit (TXRU)) 10, and a beam can be directed to a desired direction for a transmission signal with the antenna elements 12 performing transmission with a phase shifter 11 of each of the antenna elements performing phase control. Typically, the TXRU may be defined as an antenna port, and only the antenna port may be defined in the terminal apparatus 1. The directivity in a desired direction can be obtained by controlling the phase shifter 11, whereby the base station apparatus 2 can communicate with the terminal apparatus 1 using a beam with a high gain.

FIGS. 6A to 6I are diagrams, each illustrating a first configuration example of PTRS mapped to a first resource element. In FIGS. 6A to 6I, a hatched section represents a resource element to which PTRS is mapped, and other sections represent resource elements to which data is mapped. In FIGS. 6A to 6I, FIGS. 6A to 6I are respectively defined as Patterns 1 to 9. Patterns 1 to 3 are examples in which PTRS are continuously mapped in the time direction. Patterns 4 to 6 are examples in which PTRS are mapped at an interval with one symbol in the time direction, and Patterns 7 through 9 are examples of mapping at an interval with two symbols in the time direction. Note that the PTRS are not limited to FIGS. 6A to 6I, and may be mapped at an interval with more than two symbols in the time direction. The interval in the frequency direction and the subcarrier positions are also not limited to those in FIGS. 6A to 6I. One or a plurality of the patterns illustrated in FIGS. 6A to 6I may be defined for the PTRS. Note that the PTRS mapping pattern may be configured in advance as illustrated in FIGS. 6A to 6I, and PTRS may be generated based on the pattern number. Alternatively, PTRS may be generated by specifying a position where the PTRS is mapped.

FIG. 7A is a diagram illustrating a second configuration example of PTRS mapped to a single resource element. In FIG. 7A, a hatched section represents a resource element onto which PTRS is mapped, and another section represents a resource element to which data is mapped. FIG. 7A is defined as Pattern 10. Pattern 10 of FIG. 7A is an example where PTRS is mapped at an interval with one symbol in the time direction in the subcarriers whose numbers are identical to those of Pattern 5 in FIGS. 6A to 6I, but the mapping positions of the PTRS on the fourth subcarrier from the top is different from those of Pattern 5 in FIGS. 6A to 6I.

Here, the terminal apparatus 1 may not have a PUSCH signal mapped to a resource element to which PTRS has been mapped. In other words, in the case that the PUSCH signal is not mapped, a rate match may be applied in which the resource element with the PTRS mapped does not serve as a resource element to which the PUSCH signal can be mapped. The PUSCH signal mapped to the resource element to which PTRS is mapped may be overwritten with PTRS. In this case, the base station apparatus 3 may perform demodulation processing assuming that data is mapped to the resource element with PTRS mapped.

Different PTRS may be generated differently depending on a frequency band. In a low frequency band that is less susceptible to phase rotation a smaller number of resource elements to which PTRS are mapped may be configured. In a high frequency band susceptible to phase rotation a larger number of resource elements to which PTRS are mapped may be configured. PTRS may be configured for each frequency band as in an example where Pattern 7 is configured in a case that the frequency band is 4 GHz, and Pattern 2 is configured in a case that the frequency band is 40 GHz. PTRS may be configured for each frequency band as in an example where Pattern 2 is configured in the case that the frequency band is 4 GHz, and Pattern 3 is configured in the case that the frequency band is 40 GHz. PTRS may be configured for each frequency band as in an example where Pattern 5 is configured in the case that the frequency band is 4 GHz, and Pattern 2 is configured in the case that the frequency band is 40 GHz. With the number of resource elements to which PTRS are mapped being increased for a high frequency band susceptible to phase rotation as described above, phase tracking performance can be improved. With the number of resource elements to which PTRS are mapped being reduced for a low frequency band regarded is being relatively less susceptible to phase rotation as described above, overhead due to PTRS can be reduced. Note that, PTRS may not be mapped in some of low frequency bands unaffected by phase rotation.

In a case that the PTRS pattern is configured, the terminal apparatus 1 may increase the number of PTRS in the frequency direction depending on a scheduling bandwidth. For example, in a case that PTRS is mapped onto the fifth subcarrier in a single resource block, the number of subcarriers including PTRS on a frequency axis may be increased in proportion to the number of resource blocks allocated based on scheduling, that is, Downlink Control Information (DCI) transmitted in a physical downlink control channel. The number of subcarriers including PTRS on the frequency axis in a resource block may be determined based on a frequency band. The density of the PTRS in the frequency direction may be configured, activated, or indicated by RRC, MAC CE, or DCI. The density of the PTRS on the frequency axis may be defined by the number of resource elements including PTRS in a resource block or the number of subcarriers.

Furthermore, the density of the PTRS in the time direction may be determined by the frequency band. For example, in a case that the frequency band is 4 GHz, PTRS may be transmitted based on Pattern 7, and in a case of 30 GHz, the PTRS may be transmitted with Pattern 1. For example, in the case that the frequency band is 4 GHz, PTRS may be transmitted based on Pattern 9, and in case 30 GHz, the PTRS may be transmitted with Pattern 6. The density of the PTRS in the time direction may be configured, activated, or indicated by RRC, MAC CE, or DCI. The density on the time axis may be defined by the number of resource elements including PTRS in a resource block, the number of OFDM symbols in a slot, or the number of OFDM symbols in a subframe.

PTRS may be generated differently depending on a Modulation and Coding Scheme (MSC) and a modulation scheme. The number of resource elements to which the PTRS are mapped may be large in a case that the modulation order is high, and may be small in a case that the modulation order is low. PTRS may be configured for each modulation scheme as in an example where Pattern 3 is configured in a case that a modulation scheme is 256 QAM and Pattern 1 is configured in a case that a modulation scheme is 16 QAM. PTRS may be configured for each modulation scheme as in an example where Pattern 1 is configured in the case that the modulation scheme is 256 QAM and Pattern 4 is configured in a case that the modulation scheme is 16 QAM. With the number of resource elements to which PTRS are mapped being increased for a high modulation order as described above, phase tracking performance can be improved. With the number of PTRS being reduced for a low modulation order, overhead due to PTRS can be reduced while maintaining the phase tracking performance. Note that PTRS may not be mapped in a case that the modulation order is low and the influence of phase rotation is not considered to be a problem.

PTRS may be configured for each radio transmission scheme. The number of resource elements to which PTRS are mapped may be configured to be the same or different between a case that the radio transmission scheme is DFTS-OFDM and a case that the radio transmission scheme is CP-OFDM. For example, the same pattern may be selected for the case of DFTS-OFDM and the case of CP-OFDM. Pattern 1 may be configured in the case of DFTS-OFDM and Pattern 10 may be configured for the case of CP-OFDM. Thus, different patterns with the same number of PTRS may be configured. With the number of the resource elements to which PTRS are mapped being the same between the case of DFTS-OFDM and the case of CP-OFDM as described above, the processing load for generating PTRS can be equalized. Furthermore, the number of PTRS in the case of DFTS-OFDM may be configured to be greater than the number of PTRS in the case of CP-OFDM. For example, Pattern 2 may be configured in the case of DFTS-OFDM and Pattern 1 may be configured in the case of CP-OFDM. Alternatively, Pattern 1 may be configured in the case of DFTS-OFDM, and Pattern 4 may be configured in the case of CP-OFDM. With the number of the resource elements to which PTRS are mapped being different between the case of DFTS-OFDM and the case of CP-OFDM as described above, phase tracking can be configured to be suitable for characteristics of a transmission scheme.

In the case of DFTS-OFDM, a PTRS symbol may be inserted at a particular time position before input to DFT. For example, in a case that the number of PRBs that are mapped to resource elements by using frequency-first mapping for scheduling is 4 (=60 modulation symbols), the PTRS may be inserted into the 6th, 18th (=12+6), 30th (12*2+6), and 42th (12*3+6) symbol of the time symbols to be input to DFT for generating DFTS-OFDM symbols before DFT spreading. In addition, in a case of mapping to a resource element by using time first mapping, the PTRS may be inserted into the first X symbol(s) before the DFT spreading. The PTRS may be inserted into the X symbol(s) in particular DFTS-OFDM symbols in the slot before the DFT spreading. X may be the number of DFTS-OFDM symbols included in the slot. Alternatively, PTRS symbols may be mapped in a specific pattern prior to DFT. Alternatively, after the DFT spreading PTRS may be mapped in a time and/or at a frequency.

PTRS may be configured in consideration of the moving speed of the terminal apparatus. In a case that the moving speed is high, the number of resource elements to which the PTRS are mapped may be increased, and in a case that the moving speed is low, the number of resource elements to which the PTRS are mapped may be reduced. PTRS may be configured in consideration of the moving speed, as in an example where the pattern 3 is configured in the case that the moving speed is high, and the pattern 7 is configured in the case that the moving speed is low. PTRS may be configured in consideration of the moving speed, as in an example where the pattern 3 is configured in the case that the moving speed is high, and the pattern 1 is configured in the case that the moving speed is low. PTRS may be configured in consideration of the moving speed, as in an example where the pattern 2 is configured in the case that the moving speed is high, and the pattern 8 is configured in the case that the moving speed is low. Accordingly, phase tracking can be performed appropriately in consideration of the moving speed.

Note that PTRS may be configured by using a plurality of conditions. The plurality of conditions means parameters such as a frequency band, a scheduling bandwidth, an MCS, a modulation scheme, a radio transmission scheme, and/or a moving speed of the terminal apparatus, and at least one of the parameters may be selected. For example, PTRS may be configured based on a radio transmission scheme and a frequency band, or may be configured based on a radio transmission scheme, a frequency band, and a modulation scheme. Note that a pattern of PTRS may be defined for each radio transmission scheme. For example, in the case of DFTS-OFDM, the pattern of PTRS may be defined to be Pattern 1, Pattern 2, or Pattern 3, and in the case of CP-OFDM, the pattern of PTRS may be defined to be Pattern 4, Pattern 5, or Pattern 6. Furthermore, in a case that transmission is performed in a DFTS-OFDM scheme in the frequency band of 40 GHz, PTRS may be selected from Pattern 1, Pattern 2, and Pattern 3, based on the frequency band. Additionally, in the case of DFTS-OFDM, a pattern where PTRS are mapped at the frequency position of the third subcarrier from the bottom may be defined (e.g., Pattern 1, Pattern 4, and Pattern 6). In the case of CP-OFDM, a pattern where the PTRS are mapped at the frequency position of the fifth subcarrier from the bottom may be defined.

Note that the base station apparatus 3 and the terminal apparatus 1 may retain the pattern of PTRS and the pattern number in advance. Furthermore, the base station apparatus 3 may transmit the PTRS pattern number as reference signal pattern information to the terminal apparatus 1. The terminal apparatus 1 may generate PTRS by using the PTRS pattern retained in advance and the reference signal pattern information notified from the base station apparatus 3. Here, the reference signal pattern information is information for indicating the pattern number of predefined PTRS.

The base station apparatus 3 may transmit reference signal mapping information to the terminal apparatus 1. Here, the reference signal mapping information is information for indicating a position at which the PTRS is mapped. For example, the reference signal mapping information may be a subcarrier spacing (e.g., continuation, an interval with one subcarrier, or an interval with two subcarriers) for the PTRS mapping, the number of subcarrier onto which the PTRS is mapped, a symbol interval (e.g., continuation, an interval with one symbol, or an interval with two symbols) at which the PTRS is mapped in the time direction, a position of the symbol at which PTRS is mapped in the time direction, or a combination of these. For example, the reference signal mapping information, in which the subcarrier number 3 is configured as information of the frequency direction and the continuation is configured as information of the time direction, indicates Pattern 1 in FIGS. 6A to 6I. In this case, the base station apparatus 3 notifies the terminal apparatus 1 of the information of the frequency direction and the information of the time direction as the reference signal mapping information. Note that, for example, in a case that the information of the frequency direction is predetermined, only the information of the time direction may be notified, or in a case that the information of the time direction is predetermined, only the information of the frequency direction may be notified.

Figure 10:
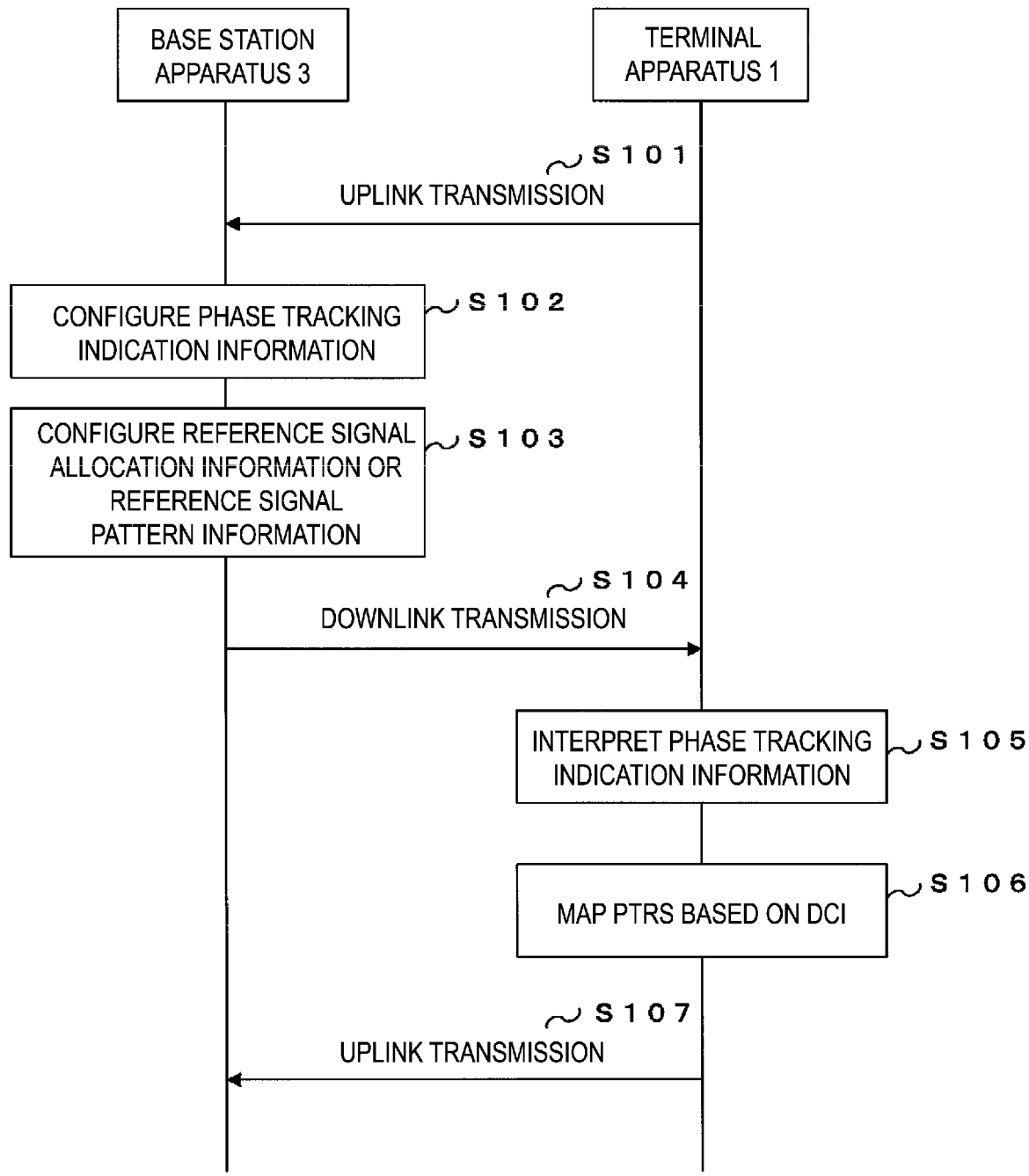
FIG. 10 is a diagram illustrating an overview of a flow of a first process between the base station apparatus 3 and the terminal apparatus 1 according to the present embodiment.

FIG. 10 is a diagram illustrating an overview of a flow of first processing between the base station apparatus 3 and the terminal apparatus 1 according to the present embodiment. In FIG. 10, the base station apparatus 3 determines the mapping of PTRS and the presence or absence of PTRS, and indicates the mapping of PTRS and the presence or absence of PTRS to the terminal apparatus 1. Here, processing involved in the generation of PTRS will be mainly described.

In S101, the terminal apparatus 1 performs uplink transmission. In this process, the terminal apparatus 1 may transmit UE Capability (terminal capability information) including phase tracking capability information to the base station apparatus 3. The phase tracking capability information is information for indicating whether the terminal apparatus 1 has the capability of transmitting PTRS. For example, the phase tracking capability information may be information for indicating whether the terminal apparatus 1 has the function of mapping PTRS, or may be information for indicating whether the terminal apparatus 1 has a function to support NR. The terminal apparatus 1 may determine whether to remove phase noise, and determine the phase tracking capability information in consideration of the result. For example, in a case that the terminal apparatus 1 is moving at high speed, the phase tracking capability information is configured to indicate that the terminal apparatus 1 has the capability of mapping PTRS, for the terminal apparatus 1 to remove phase noise.

In S102, the base station apparatus 3 may configure phase tracking indication information, and may include the phase tracking indication information in DCI. Here, the phase tracking indication information is information for indicating whether or not the base station apparatus 3 transmits PTRS to the terminal apparatus 1. Note that the base station apparatus 3 may configure the phase tracking indication information based on the phase tracking capability information notified from the terminal apparatus 1. For example, the phase tracking indication information may be configured such that PTRS is transmitted only in a case that the phase tracking capability information indicates that the function of mapping PTRS is supported.

In S103, the base station apparatus 3 configures reference signal mapping information or reference signal pattern information. The base station apparatus 3 may include the reference signal mapping information or the reference signal pattern information in DCI.

In S104, the base station apparatus 3 performs downlink transmission. In this process, the information configured in S102 and S103 is transmitted to the terminal apparatus 1.

In S105, the terminal apparatus 1 interprets the phase tracking indication information. In a case that the phase tracking indication information is configured to indicate to the terminal apparatus 1 to transmit PTRS, the terminal apparatus 1 maps the PTRS to a resource element in S106. On the other hand, in a case that the phase tracking indication information is not configured to indicate to the terminal apparatus 1 to transmit PTRS, the terminal apparatus 1 maps no PTRS to the resource element.

In S106, the terminal apparatus 1 generates PTRS based on the information included in DCI and the like, and maps the PTRS to the resource element. In addition to the information included in the DCI, information held by the terminal apparatus may be used. For example, at least one of the reference signal mapping information or reference signal pattern information, MCS, a modulation scheme, a frequency band, a radio transmission scheme, information of the moving speed of the terminal apparatus 1 and/or the number of resource blocks allocated to the terminal apparatus 1, or the like may be used.

In S107, the terminal apparatus 1 performs uplink transmission.

Figure 11:
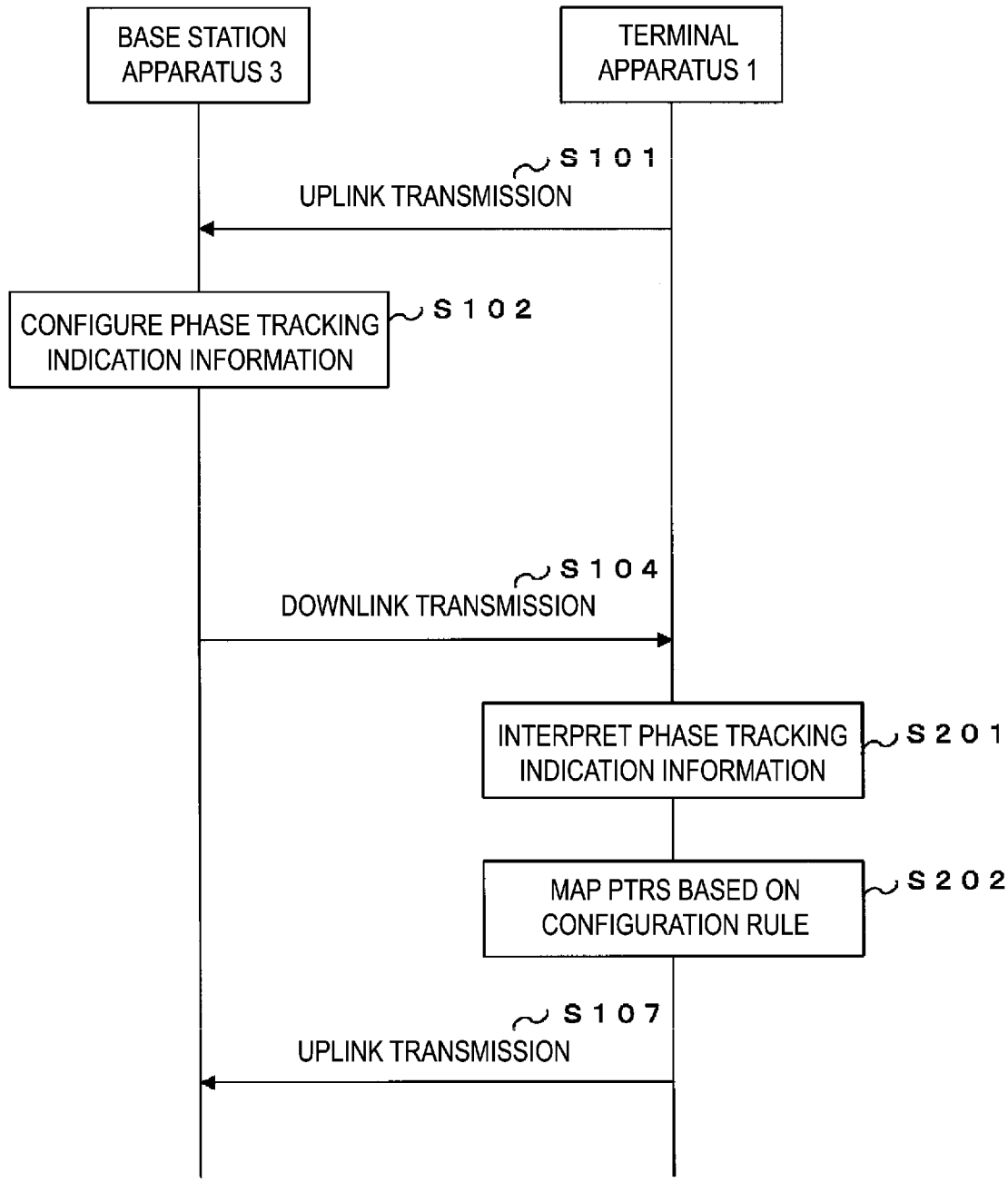
FIG. 11 is a diagram illustrating an overview of a flow of a second process between the base station apparatus 3 and the terminal apparatus 1 according to the present embodiment.

FIG. 11 is a diagram illustrating an overview of a flow of second processing between the base station apparatus 3 and the terminal apparatus 1 according to the present embodiment. In FIG. 11, the base station apparatus 3 indicates only the presence or absence of PTRS to the terminal apparatus 1. The base station apparatus 3 and the terminal apparatus 1 have a PTRS configuration rule configured in advance, and based on the information held, the terminal apparatus 1 generates PTRS and maps the PTRS to a resource element. Note that some reference signs in FIG. 11 are the same as those in FIG. 10, and the processing for the same reference sign is the same between FIG. 11 and FIG. 10. Points that are different from FIG. 10 will be mainly described below.

In S201, the terminal apparatus 1 interprets the phase tracking indication information. In S202, in a case that the phase tracking indication information is configured to indicate to the terminal apparatus 1 to transmit PTRS, the terminal apparatus 1 maps the PTRS to a resource element. On the other hand, in a case that the phase tracking indication information is not configured to indicate to the terminal apparatus 1 to transmit PTRS, the terminal apparatus 1 maps no PTRS to the resource element.

In S202, based on the configuration rule configured in advance, the terminal apparatus 1 generates PTRS and maps the PTRS to a resource element. The configuration rule may be determined based on information included in DCI or the like, or may be determined based on information held by the terminal apparatus 1. For example, at least one of MCS, a modulation scheme, a frequency band, a radio transmission scheme, information of the moving speed of the terminal apparatus 1 and/or the number of resource blocks allocated to the terminal apparatus 1, or the like may be used.

Figure 12:
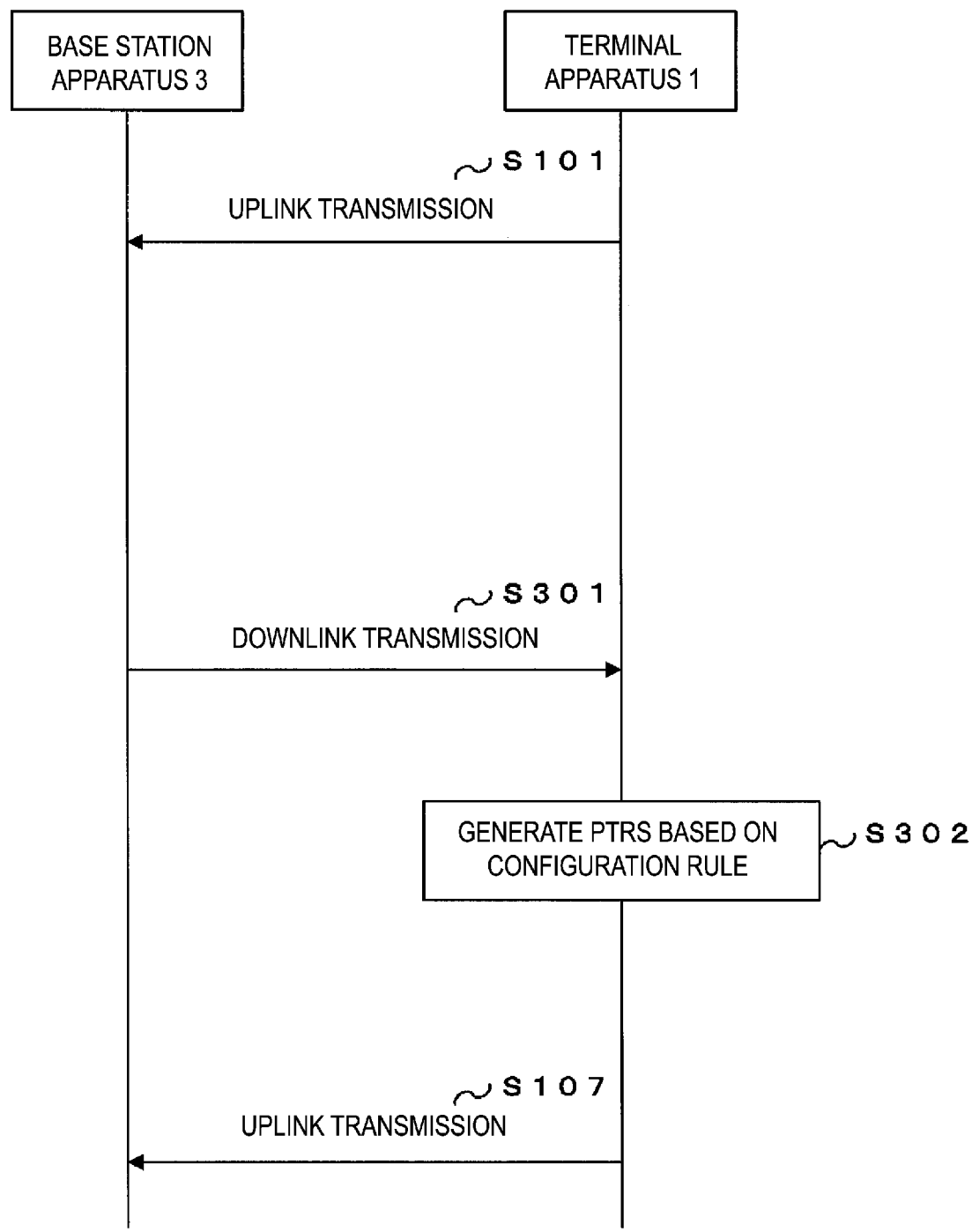
FIG. 12 is a diagram illustrating an overview of a flow of a third process between the base station apparatus 3 and the terminal apparatus 1 according to the present embodiment.

FIG. 12 is a diagram schematically illustrating a flow of third processing between the base station apparatus 3 and the terminal apparatus 1 according to the present embodiment. In FIG. 12, the base station apparatus 3 does not perform an indication of the presence or absence of PTRS. The base station apparatus 3 and the terminal apparatus 1 have a PTRS configuration rule determined in advance, and based on the information held, the terminal apparatus 1 generates PTRS and maps the PTRS to a resource element. Note that some reference signs in FIG. 12 are the same as those in FIG. 10 or FIG. 11, and the processing for the same reference sign is the same between FIG. 12 and FIG. 10 or FIG. 11. Points that are different from FIG. 10 and FIG. 11 will be mainly described below.

In S301, the base station apparatus 3 performs downlink transmission. In this process, no phase tracking indication information is transmitted. Note that the reference signal mapping information or the reference signal pattern information may or may not be transmitted.

In S302, based on the configuration rule configured in advance, the terminal apparatus 1 generates PTRS and maps the PTRS to a resource element. The configuration rule may be determined based on information included in DCI or the like, or may be determined based on information held by the terminal apparatus 1. For example, at least one of MCS, a modulation scheme, a frequency band, a radio transmission scheme, information of the moving speed of the terminal apparatus 1 and/or the number of resource blocks allocated to the terminal apparatus 1, or the like may be used. Note that the configuration rule may include a condition not to generate PTRS. For example, PTRS may not be generated in a case that the influence of the phase rotation would not cause a problem. For example, in a case that the reference signal pattern information is transmitted from the base station apparatus 3, it may be determined that a phase tracking indication is present, and the PTRS indicated by the reference signal pattern information may be generated.

Note that in FIG. 10, FIG. 11, and FIG. 12, in the terminal apparatus 1, an antenna port for transmitting PTRS is the same as at least one of antenna ports for DMRS. For example, in a case that the number of antenna ports for DMRS is two and the number of antenna ports for PTRS is one, the antenna port for the PTRS may be the same as one or both of the antenna ports for the DMRS. The antenna port for the DMRS and the antenna port for the PTRS may be assumed to be quasi co-located (QCL). For example, a frequency offset due to DMRS phase noise is inferred from the frequency offset compensated by PTRS. Furthermore, regardless of whether PTRS is mapped, DMRS may always be transmitted.

Note that the radio transmission scheme may be configured, activated or indicated by RRC, MAC, and DCI. Thus, the terminal apparatus 1 may map PTRS in consideration of the radio transmission scheme notified from the base station apparatus 3.

One aspect of the present embodiment may be operated in carrier aggregation or dual connectivity with Radio Access Technology (RAT), such as LTE and LTE-A/LTE-A Pro. This may be used in some or all of cells or cell groups, or some or all carriers or carrier groups (such as primary cell (PCell), secondary cell (SCell), primary secondary cells (PSCell), Master Cell Group (MCG), Secondary Cell Group (SCG), for example). Moreover, it may be used in a stand-alone application where a stand-alone operation is performed.

Configurations of apparatuses according to the present embodiment will be described below. Here, an example is described where CP-OFDM is applied as a downlink radio transmission scheme and CP-OFDM, DFTS-OFDM (SC-FDM) is applied as an uplink radio transmission scheme.

Figure 8:
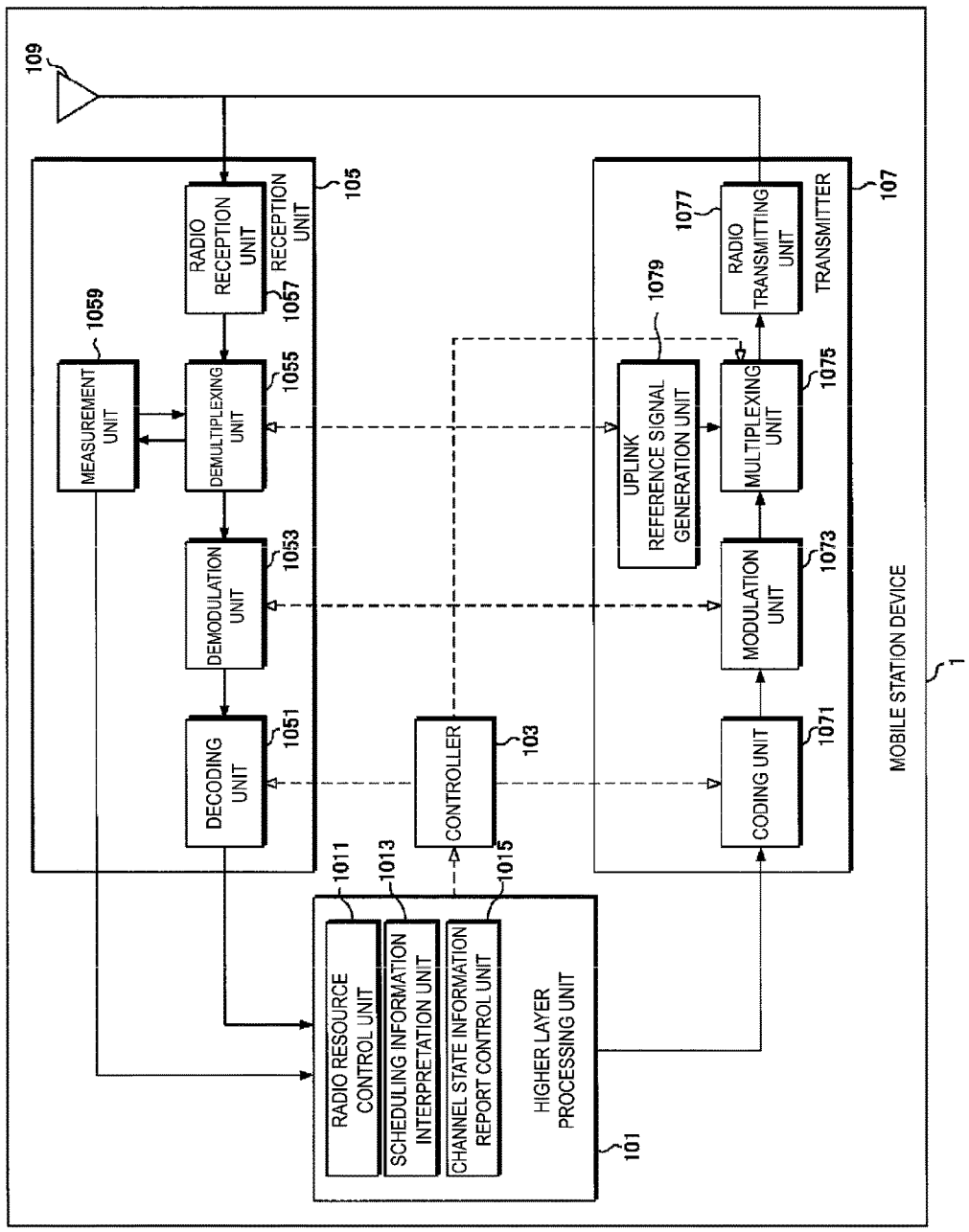
FIG. 8 is a schematic block diagram illustrating a configuration of a terminal apparatus 1 according to the present embodiment.

FIG. 8 is a schematic block diagram illustrating a configuration of the terminal apparatus 1 according to the present embodiment. As illustrated in FIG. 8, the terminal apparatus 1 is configured to include a higher layer processing unit 101, a control unit 103, a reception unit 105, a transmission unit 107, and a transmit and/or receive antenna 109. Furthermore, the higher layer processing unit 101 is configured to include a radio resource control unit 1011, a scheduling information interpretation unit 1013, and a Channel State Information (CSI) report control unit 1015. Furthermore, the reception unit 105 is configured to include a decoding unit 1051, a demodulation unit 1053, a demultiplexing unit 1055, a radio reception unit 1057, and a measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. The higher layer processing unit 101 performs processing of a Medium Access Control (MAC) layer, a Packet Data Convergence Protocol (PDCP) layer, a Radio Link Control (RLC) layer, and a Radio Resource Control (RRC) layer.

The radio resource control unit 1011 included in the higher layer processing unit 101 manages various pieces of configuration information of the terminal apparatus 1 itself. Furthermore, the radio resource control unit 1011 generates information to be mapped to each uplink channel, and outputs the generated information to the transmission unit 107.

The scheduling information interpretation unit 1013 included in the higher layer processing unit 101 interprets the DCI (scheduling information) received through the reception unit 105, generates control information for control of the reception unit 105 and the transmission unit 107, in accordance with a result of interpreting the DCI, and outputs the generated control information to the control unit 103.

The CSI report control unit 1015 indicates to the measurement unit 1059 to derive Channel State Information (RI/PMI/CQI/CRI) relating to the CSI reference resource. The CSI report control unit 1015 indicates to the transmission unit 107 to transmit RI/PMI/CQI/CRI. The CSI report control unit 1015 sets a configuration to be used in a case that the measurement unit 1059 calculates CQI.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station apparatus 3 through the transmit and/or receive antenna 109, and outputs the resulting information to the higher layer processing unit 101.

The radio reception unit 1057 converts (down converts) a downlink signal received through the transmit and/or receive antenna 109 into a signal of an intermediate frequency, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to a Guard Interval (GI) from the digital signal resulting from the conversion, performs Fast Fourier Transform (FFT) on the signal from which the Guard Interval has been removed, and extracts a signal in the frequency domain.

The demultiplexing unit 1055 demultiplexes the extracted signal into downlink PCCH, PSCH, and the downlink reference signal. Furthermore, the demultiplexing unit 1055 makes a compensation of channels including PCCH and PSCH from the channel estimate input from the measurement unit 1059. Furthermore, the demultiplexing unit 1055 outputs the downlink reference signal resulting from the demultiplexing, to the measurement unit 1059.

The demodulation unit 1055 demodulates the downlink PCCH and outputs a result of the demodulation to the decoding unit 1051. The decoding unit 1051 attempts to decode the PCCH. In a case of succeeding in the decoding, the decoding unit 1051 outputs downlink control information resulting from the decoding and an RNTI to which the downlink control information corresponds, to the higher layer processing unit 101.

The demodulation unit 1055 demodulates the PSCH in compliance with a modulation scheme notified with the downlink grant, such as Quadrature Phase Shift Keying (QPSK), 16 Quadrature Amplitude Modulation (QAM), 64 QAM, or 256 QAM, and outputs a result of the demodulation to the decoding unit 1051. The decoding unit 1051 decodes the data in accordance with information on transmission or an original coding rate notified with the downlink control information, and outputs, to the higher layer processing unit 101, the downlink data (the transport block) resulting from the decoding.

The measurement unit 1059 performs downlink path loss measurement, channel measurement, and/or interference measurement from the downlink reference signal input from the demultiplexing unit 1055. The measurement unit 1059 outputs, to the higher layer processing unit 101, the measurement result and CSI calculated based on the measurement result. Furthermore, the measurement unit 1059 calculates a downlink channel estimate from the downlink reference signal and outputs the calculated downlink channel estimate to the demultiplexing unit 1055.

The transmission unit 107 generates the uplink reference signal in accordance with the control signal input from the control unit 103, codes and modulates the uplink data (the transport block) input from the higher layer processing unit 101, multiplexes PUCCH, PUSCH, and the generated uplink reference signal, and transmits a result of the multiplexing to the base station apparatus 3 through the transmit and/or receive antenna 109.

The coding unit 1071 performs coding on the Uplink Control Information and the uplink data input from the higher layer processing unit 101. The modulation unit 1073 modulates the coded bits input from the coding unit 1071, in compliance with a modulation scheme such as BPSK, QPSK, 16 QAM, 64 QAM, or 256 QAM.

The uplink reference signal generation unit 1079 generates a sequence acquired according to a rule (formula) prescribed in advance, based on a physical cell identifier (also referred to as a Physical Cell Identity (PCI), a cell ID, or the like) for identifying the base station apparatus 3, a bandwidth to which the uplink reference signal is mapped, a cyclic shift notified with the uplink grant, a parameter value for generation of a DMRS sequence, and the like.

On the basis of the information used for the scheduling of PUSCH, the multiplexing unit 1075 determines the number of PUSCH layers to be spatial-multiplexed, maps multiple pieces of uplink data to be transmitted on the same PUSCH to multiple layers through Multiple Input Multiple Output Spatial Multiplexing (MIMO SM), and performs precoding on the layers.

In accordance with the control signal input from the control unit 103, the multiplexing unit 1075 performs Discrete Fourier Transform (DFT) on modulation symbols of PSCH. Furthermore, the multiplexing unit 1075 multiplexes PCCH and PSCH signals and the generated uplink reference signal for each transmit antenna port. To be more specific, the multiplexing unit 1075 maps the PCCH and PSCH signals and the generated uplink reference signal to the resource elements for each transmit antenna port.

The radio transmission unit 1077 performs Inverse Fast Fourier Transform (IFFT) on a signal resulting from the multiplexing, performs modulation in compliance with an SC-FDM scheme, adds the Guard Interval to the SC-FDM-modulated SC-FDM symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 109 for transmission.

Figure 9:
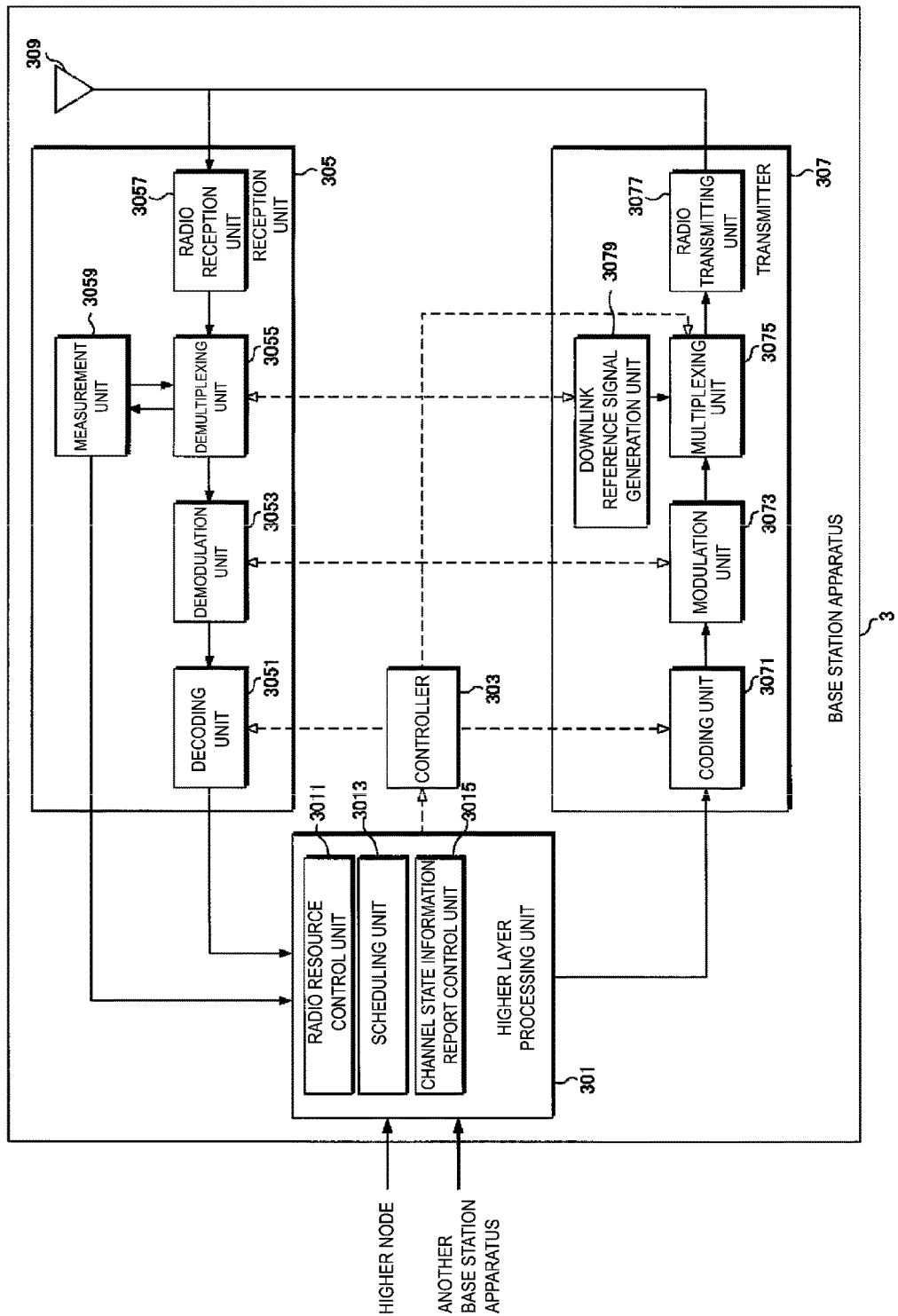
FIG. 9 is a schematic block diagram illustrating a configuration of a base station apparatus 3 according to the present embodiment.

FIG. 9 is a schematic block diagram illustrating a configuration of the base station apparatus 3 according to the present embodiment. As is illustrated, the base station apparatus 3 is configured to include a higher layer processing unit 301, a control unit 303, a reception unit 305, a transmission unit 307, and a transmit and/or receive antenna 309. The higher layer processing unit 301 is configured to include a radio resource control unit 3011, a scheduling unit 3013, and a CSI report control unit 3015. The reception unit 305 is configured to include a decoding unit 3051, a demodulation unit 3053, a demultiplexing unit 3055, a radio reception unit 3057, and a measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of a Medium Access Control (MAC) layer, a Packet Data Convergence Protocol (PDCP) layer, a Radio Link Control (RLC) layer, and a Radio Resource Control (RRC) layer.

Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PSCH, system information, the RRC message, the MAC Control Element (CE), and the like, and outputs a result of the generation or the acquirement to the transmission unit 307. Furthermore, the radio resource control unit 3011 manages various configuration information for each of the terminal apparatuses 1.

The scheduling unit 3013 included in the higher layer processing unit 301 determines a frequency and a subframe to which the physical channels (PSCH) are allocated, the coding rate and modulation scheme for the physical channels (PSCH), the transmit power, and the like, from the received CSI and from the channel estimate, channel quality, or the like input from the measurement unit 3059. The scheduling unit 3013 generates the control information in order to control the reception unit 305 and the transmission unit 307 in accordance with a result of the scheduling, and outputs the generated information to the control unit 303. The scheduling unit 3013 generates the information (e.g., the DCI (format)) to be used for the scheduling of the physical channels (PSCH), based on the result of the scheduling.

The CSI report control unit 3015 included in the higher layer processing unit 301 controls a CSI report that is made by the terminal apparatus 1. The CSI report control unit 3015 transmits information that is assumed in order for the terminal apparatus 1 to derive RI/PMI/CQI in the CSI reference resource and that shows various configurations, to the terminal apparatus 1 through the transmission unit 307.

On the basis of the control information originating from the higher layer processing unit 301, the control unit 303 generates a control signal for controlling the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal apparatus 1 through the transmit and/or receive antenna 309, and outputs information resulting from the decoding to the higher layer processing unit 301. The radio reception unit 3057 converts (down-converts) an uplink signal received through the transmit and/or receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 3057 removes a portion corresponding to the Guard Interval (GI) from the digital signal resulting from the conversion. The radio reception unit 3057 performs Fast Fourier Transform (FFT) on the signal from which the Guard Interval has been removed, extracts a signal in the frequency domain, and outputs the resulting signal to the demultiplexing unit 3055.

The demultiplexing unit 1055 demultiplexes the signal input from the radio reception unit 3057 into PCCH, PSCH, and the signal such as the uplink reference signal. The demultiplexing is performed based on radio resource allocation information that is determined in advance by the base station apparatus 3 using the radio resource control unit 3011 and that is included in the uplink grant notified to each of the terminal apparatuses 1. Furthermore, the demultiplexing unit 3055 makes a compensation of channels including PCCH and PSCH from the channel estimate input from the measurement unit 3059. Furthermore, the demultiplexing unit 3055 outputs an uplink reference signal resulting from the demultiplexing, to the measurement unit 3059.

The demodulation unit 3053 performs Inverse Discrete Fourier Transform (IDFT) on PSCH, acquires modulation symbols, and performs reception signal demodulation, that is, demodulates each of the modulation symbols on PCCH and PSCH, in compliance with the modulation scheme prescribed in advance, such as Binary Phase Shift Keying (BPSK), QPSK, 16 QAM, 64 QAM, or 256 QAM, or in compliance with the modulation scheme that the base station apparatus 3 itself notifies in advance each of the terminal apparatuses 1 with the uplink grant. The demodulation unit 3053 demultiplexes the modulation symbols of multiple pieces of uplink data transmuted on the same PSCH with the MIMO SM, based on the number of spatial-multiplexed sequences notified in advance with the uplink grant to each of the terminal apparatuses 1 and information designating the precoding to be performed on the sequences.

The decoding unit 3051 decodes the coded bits of PCCH and PSCH, which have been demodulated, at the coding rate in compliance with a coding scheme prescribed in advance, the transmission or an original coding rate being prescribed in advance or being notified in advance with the uplink grant to the terminal apparatus 1 by the base station apparatus 3 itself, and outputs the decoded uplink data and uplink control information to the higher layer processing unit 101. In a case that the PSCH is re-transmitted, the decoding unit 3051 performs the decoding with the coded bits input from the higher layer processing unit 301 and retained in an HARQ buffer, and the demodulated coded bits. The measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the Downlink Control Information, and the downlink data that are input from the higher layer processing unit 301, multiplexes PCCH, PSCH, and the downlink reference signal, and transmits a result of the multiplexing or transmits these using different resources to the terminal apparatus 1 through the transmit and/or receive antenna 309.

The coding unit 3071 performs coding on the Downlink Control Information and the downlink data input from the higher layer processing unit 301. The modulation unit 3073 modulates the coded bits input from the coiling unit 3071, in compliance with the modulation scheme such as BPSK, QPSK, 16 QAM, 64 QAM, or 256 QAM.

The downlink reference signal generation unit 3079 generates, as the downlink reference signal, a sequence that is already known to the terminal apparatus 1 and that is acquired in accordance with a rule prescribed in advance based on the physical cell identity (PCI) for identifying the base station apparatus 3, or the like.

The multiplexing unit 3075, in accordance with the number of PSCH layers to be spatial-multiplexed, maps one or multiple pieces of downlink data to be transmitted on one PSCH to one or multiple layers, and performs precoding on the one or multiple layers. The multiplexing unit 375 multiplexes the downlink physical channel signal and the downlink reference signal for each transmit antenna port. Furthermore, the multiplexing unit 375 allocates the downlink physical channel signal and the downlink reference signal to the resource element for each transmit antenna port.

The radio transmission unit 3077 performs Inverse Fast Fourier Transform (IFFT) on the modulation symbol resulting from the multiplexing or the like, performs the modulation in compliance with an OFDM scheme to generate an OFDM symbol, adds the Guard Interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency signal, removes unnecessary frequency components, performs power amplification, and outputs a final result to the transmit and/or receive antenna 309 for transmission.

(1) More specifically, a terminal apparatus 1 according to a first aspect of the present invention is a terminal apparatus for communicating with a base station apparatus and including: a transmission unit configured to transmit a Phase-tracking reference signal (PTRS); and a higher layer processing unit configured to configure information of mapping of the PTRS. An antenna port for the PTRS is associated with an antenna port for a Demodulation reference signal (DMRS).

(2) In the first aspect described above, the antenna port for the PTRS is identical to an antenna port for a DMRS.

(3) In the first aspect described above, the antenna port for the PTRS is identical to the antenna port for the DMRS.

(5) A base station apparatus 3 according to a first aspect of the present invention is a base station apparatus for communicating with a terminal apparatus and including: a reception unit configured to receive a Phase-tracking reference signal (PTRS); and a higher layer processing unit configured to configure information of mapping of the PTRS in the terminal. An antenna port for the PTRS is associated with an antenna port for a in the terminal. An antenna port for the PTRS is associated with an antenna port for a Demodulation reference signal (DMRS).

(A1) More specifically, a terminal apparatus 1 according to an aspect A1 of the present invention is a terminal apparatus for communicating with a base station apparatus and including a transmission unit configured to transmit a first reference signal, a second reference signal, and a physical uplink shared channel, and a reception unit configured to receive first information and a physical downlink control channel. The first information is information used by the base station apparatus to configure transmission of the second reference signal. The physical uplink shared channel is transmitted based on downlink control information received with the physical downlink control channel. The first reference signal is always provided to a partial resource element in a resource block determined based on the downlink control information. Whether the second reference signal is mapped to the resource element is determined based on the first information. In a case that the physical uplink shared channel is transmitted with the Discrete Fourier Transform Spread Orthogonal Frequency Division Multiplexing (DFT-S-OFDM), the second reference signal is mapped and transmitted based on one or a plurality of first patterns. In a case that the physical uplink shared channel is transmitted with Orthogonal Frequency Division Multiplexing (OFDM), the second reference signal is mapped and transmitted based on one or a plurality of second patterns. The one or a plurality of first patterns and the one or a plurality of second patterns are defined by a position of the time and frequency, at which the second reference signal is mapped in one resource block.

(A2) In the aspect A1 described above, the number of resource elements to which reference signals are mapped in the first pattern is the same as the number of resource elements to which reference signals are mapped in the second pattern.

(A3) In the aspect A1 described above, the number of resource elements to which reference signals are mapped in the first pattern is the same as the number of resource elements to which reference signals are mapped in the second pattern.

(A4) In the aspect A1 described above, a radio transmission scheme for transmitting the physical uplink shared channel is notified by using the downlink control information.

(A5) A base station apparatus 3 according to an aspect A2 of the present invention is a base station apparatus for communicating with a terminal apparatus and including a transmission unit configured to transmit first information with a physical downlink control channel, and a reception unit configured to receive a first reference signal, a second reference signal, and a physical uplink shared channel. The first information is information to indicate whether to transmit the second reference signal to the terminal apparatus. The physical uplink shared channel is transmitted based on downlink control information received with the physical downlink control channel. The first reference signal is always provided to a partial resource element in a resource block determined based on the downlink control information. Whether the second reference signal is mapped to the resource element is determined based on the first information. In a case that the physical uplink shared channel is transmitted with the Discrete Fourier Transform Spread Orthogonal Frequency Division Multiplexing (DFT-S-OFDM), the second reference signal is mapped and transmitted based on one or a plurality of first patterns. In a case that the physical uplink shared channel is transmitted with Orthogonal Frequency Division Multiplexing (OFDM), the second reference signal is mapped and transmitted based on one or a plurality of second patterns. The one or a plurality of first patterns and the one or a plurality of second patterns are defined by a position of the time and frequency at which the second reference signal is mapped in one resource block.

A program running on an apparatus according to an aspect of the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing functions of an embodiment related to an aspect of the present invention may be recorded in a computer readable recording medium. The functions may be realized by causing a computer system to read the program recorded in the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining a program for a short time, or any other computer-readable recording medium.

Furthermore, each functional block or various characteristics of the apparatuses used in the above-described embodiment may be implemented or performed in an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may be constituted of a digital circuit or an analog circuit. Furthermore, in a case that with advances in semiconductor technology, a circuit integration technology appears that replaces the present integrated circuits, one or more aspects of the present invention can use a new integrated circuit based on the technology.

Note that, in the embodiment according to one aspect of the present invention, an example has been described in which the present invention is applied to a communication system including a base station apparatus and a terminal apparatus, but the present invention can also be applied to a system in which terminals communicate with each other, such as Device to Device (D2D).

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), on integrated circuit (for example, a communication chip), or a program.

REFERENCE SIGNS LIST 1 (1A, 1B, 1C) Terminal apparatus
3 Base station apparatus
10 TXRU
11 Phase shifter
12 Antenna
101 Higher laser processing unit
103 Control unit
105 Reception unit
107 Transmission unit
109 Antenna
301 Higher layer processing unit
303 Control unit
305 Reception unit
307 Transmission unit
1013 Scheduling information interpretation unit
1015 Channel State Information report control unit
1051 Decoding unit
1053 Decoder unit
1055 Demultiplexing unit
1057 Radio reception unit
1059 Measurement unit
1071 Coding unit
1073 Modulation unit
1075 Multiplexing unit
1077 Radio transmitting unit
1079 Uplink reference signal generation unit
3011 Radio resource control unit
3013 Scheduling unit
3015 Channel State Information report control unit
3051 Decoding unit
3053 Decoder unit
3055 Demultiplexing unit
3057 Radio reception unit
3059 Measurement unit
3071 Coding unit
3073 Modulation unit
3075 Multiplexing unit
3077 Radio transmitting unit
3079 Downlink reference signal generation unit

The invention claimed is:

1. A terminal apparatus for communicating with a base station, the terminal apparatus comprising:
   receiving circuitry configured to receive:
      first information indicating whether discrete Fourier transform spread orthogonal frequency division multiplexing (DFT-S-OFDM) is selected for a physical uplink shared channel (PUSCH), and
      second information for configuring time density of a phase tracking reference signal (PTRS) for the DFT-S-OFDM;
   multiplexing circuitry configured to map the PTRS to symbols of resources for the PUSCH before discrete Fourier transform (DFT) spreading based on the second information in a case that the first information indicates that the DFT-S-OFDM is selected; and
   transmitting circuitry configured to transmit a PUSCH signal and the PTRS, wherein the PTRS is transmitted on a plurality of discontinuous symbols in a time domain within a physical resource block (PRB) and on only one subcarrier in a frequency domain within the PRB,
      wherein a first of the discontinuous symbols is separate from a second of the discontinuous symbols by two symbols.

2. A base station for communicating with a terminal apparatus, the base station comprising:
   transmitting circuitry configured to transmit:
      first information indicating whether discrete Fourier transform spread orthogonal frequency division multiplexing (DFT-S-OFDM) is selected for a physical uplink shared channel (PUSCH), and
      second information for configuring time density of a phase tracking reference signal (PTRS) for the DFT-S-OFDM; and
   receiving circuitry configured to receive a PUSCH signal and the PTRS,
   wherein:
      the PTRS is mapped to symbols of resources for the PUSCH before discrete Fourier transform (DFT) spreading based on the second information in a case that the first information indicates that the DFT-S-OFDM is selected; and
      the PTRS is received on a plurality of discontinuous symbols in a time domain within a physical resource block (PRB) and on only one subcarrier in a frequency domain within the PRB,
         wherein a first of the discontinuous symbols is separate from a second of the discontinuous symbols by two symbols.

3. A method for communicating with a base station, the method comprising:
   receiving first information indicating whether discrete Fourier transform spread orthogonal frequency division multiplexing (DFT-S-OFDM) is selected for a physical uplink shared channel (PUSCH), and second information for configuring time density of a phase tracking reference signal (PTRS) for the DFT-S-OFDM;
   mapping the PTRS to symbols of resources for the PUSCH before discrete Fourier transform (DFT) spreading based on the second information in a case that the first information indicates that the DFT-S-OFDM is selected; and
   transmitting a PUSCH signal and the PTRS, wherein the PTRS is transmitted on a plurality of discontinuous symbols in a time domain within a physical resource block (PRB) and on only one subcarrier in a frequency domain within the PRB,
      wherein a first of the discontinuous symbols is separate from a second of the discontinuous symbols by two symbols.

4. A method for communicating with a terminal apparatus, the method comprising:
   transmitting first information indicating whether discrete Fourier transform spread orthogonal frequency division multiplexing (DFT-S-OFDM) is selected for a physical uplink shared channel (PUSCH), and second information for configuring time density of a phase tracking reference signal (PTRS) for the DFT-S-OFDM; and
   receiving a PUSCH signal and the PTRS,
   wherein:
      the PTRS is mapped to symbols of resources for the PUSCH before discrete Fourier transform (DFT) spreading based on the second information in a case that the first information indicates that the DFT-S-OFDM is selected; and
      the PTRS is received on a plurality of discontinuous symbols in a time domain within a physical resource block (PRB) and on only one subcarrier in a frequency domain within the PRB,
wherein a first of the discontinuous symbols is separate from a second of the discontinuous symbols by two symbols.

\* \* \* \* \*